US008358586B2

(12) United States Patent
Toda et al.

(10) Patent No.: US 8,358,586 B2
(45) Date of Patent: Jan. 22, 2013

(54) RADIO BASE STATION AND CHANNEL ALLOCATION INFORMATION TRANSMISSION METHOD

(75) Inventors: Takeshi Toda, Yokohama (JP); Shingo Joko, Yokohama (JP); Taku Nakayama, Yokohama (JP); Kenta Okino, Yokohama (JP); Chiharu Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 378 days.

(21) Appl. No.: 12/528,299

(22) PCT Filed: Feb. 20, 2008

(86) PCT No.: PCT/JP2008/052893
§ 371 (c)(1),
(2), (4) Date: Feb. 23, 2010

(87) PCT Pub. No.: WO2008/105300
PCT Pub. Date: Sep. 4, 2008

(65) Prior Publication Data
US 2010/0150083 A1 Jun. 17, 2010

(30) Foreign Application Priority Data
Feb. 23, 2007 (JP) ................................. 2007-044420
Mar. 15, 2007 (JP) ................................. 2007-067220

(51) Int. Cl.
*H04W 4/00* (2009.01)
*H04W 72/00* (2009.01)
*H04M 1/00* (2006.01)
*H04B 17/00* (2006.01)
*H04L 12/26* (2006.01)

(52) U.S. Cl. ..................... 370/252; 370/329; 455/67.11; 455/452.1; 455/509; 455/517; 455/562.1
(58) Field of Classification Search .................. 370/252, 370/329; 455/67.11, 452.1, 509, 517, 562.1
See application file for complete search history.

(56) References Cited

U.S. PATENT DOCUMENTS
6,377,564 B1 * 4/2002 Burdette et al. .............. 370/337
(Continued)

FOREIGN PATENT DOCUMENTS
JP    07-087011    3/1995
JP    2005-176160  6/2005
(Continued)

OTHER PUBLICATIONS

IEEE, Part 16: "Air Interface for Fixed and Mobile Broadband Wireless Access Systems" IEEE Std 802.16-2005 and IEEE Std 802.16-2004/Cor1-2005, pp. 1-864, Feb. 28, 2006.

*Primary Examiner* — Alpus H Hsu
(74) *Attorney, Agent, or Firm* — DLA Piper LLP (US)

(57) ABSTRACT

A radio base station includes: a propagation path characteristic acquisition unit which acquires propagation path characteristics between a radio communication terminal and a radio base station; and a channel controller which reports to the radio communication terminal that channel allocation information is transmitted by using a dedicated control channel if the acquired propagation characteristic satisfies a predetermined condition. After the channel control unit has reported to the radio communication terminal that the channel allocation information is transmitted by using an dedicated control channel, the channel control unit and a MAP processing unit transmit the channel allocation information by using an dedicated control channel instead of a broadcast control channel in the downstream frame.

6 Claims, 12 Drawing Sheets

U.S. PATENT DOCUMENTS

| | | | |
|---|---|---|---|
| 6,463,295 B1* | 10/2002 | Yun | 455/522 |
| 6,665,522 B1* | 12/2003 | Lundstrom et al. | 455/67.14 |
| 6,729,929 B1* | 5/2004 | Sayers et al. | 455/446 |
| 7,039,441 B1* | 5/2006 | Reudink et al. | 455/562.1 |
| 7,340,254 B2* | 3/2008 | Iacono | 455/442 |
| 7,684,761 B2* | 3/2010 | Hottinen | 455/69 |
| 7,773,557 B2* | 8/2010 | Grant et al. | 370/328 |
| 7,801,563 B2* | 9/2010 | Hara et al. | 455/562.1 |
| 7,881,191 B2* | 2/2011 | Liu et al. | 370/230 |
| 7,894,390 B2* | 2/2011 | Nakamata et al. | 370/329 |
| 7,969,936 B2* | 6/2011 | Bellier et al. | 370/329 |
| 2002/0034936 A1* | 3/2002 | Itoh | 455/403 |
| 2004/0228313 A1* | 11/2004 | Cheng et al. | 370/342 |
| 2006/0153227 A1* | 7/2006 | Hwang et al. | 370/465 |
| 2008/0056198 A1* | 3/2008 | Charpentier et al. | 370/332 |
| 2008/0089285 A1* | 4/2008 | Pirskanen et al. | 370/329 |
| 2008/0125155 A1* | 5/2008 | Saito | 455/510 |

FOREIGN PATENT DOCUMENTS

| | | |
|---|---|---|
| JP | 2006-319959 | 11/2006 |
| JP | 2008-048236 | 2/2008 |
| JP | 2008-113252 | 5/2008 |
| WO | 2006/109786 | 10/2006 |
| WO | 2008/053754 | 5/2008 |

* cited by examiner

RADIO BASE STATION AND CHANNEL ALLOCATION INFORMATION TRANSMISSION METHOD

CROSS REFERENCE TO RELATED APPLICATION

This application is a national stage of international application No. PCT/JP2008/052893 filed on Feb. 20, 2008, which also claims the benefit of priority under 35 USC 119 to Japanese Patent Application No. 2007-044420 filed Feb. 23, 2007 and Japanese Patent Application No. 2007-067220 filed Mar. 15, 2007, the entire contents of which are incorporated herein by reference.

TECHNICAL FIELD

The present invention relates to a radio base station and a channel allocation information transmission method for transmitting channel allocation information indicating allocation of a radio communication channel, to a radio communication terminal by using a downlink frame including a broadcast control channel broadcasted by using an omnidirectional beam and a dedicated control channel transmitted in a predetermined direction by using a directional beam.

BACKGROUND ART

Recently, a mobile communication system capable of implementing high-speed communications using orthogonal frequency division multiplexing (OFDM) has been put into practical use. As such a mobile communication system, mobile WiMAX specified in IEEE 802.16e has been known, for example.

In mobile WiMAX, a radio communication terminal is configured to receive channel allocation information (DL-MAP and UL-MAP), which is allocation information of radio communication channels, by using a broadcast control channel (BCCH) that is broadcasted by a radio base station by using an omnidirectional beam (see Non-patent Document 1).

In addition, the radio communication terminal is configured to receive channel allocation information (AAS-Diversity MAP) by using a dedicated control channel (PCCH) that is transmitted in a predetermined direction by using a directional beam, when being incapable of receiving the DL-MAP and the UL-MAP.

Being beamformed, a PCCH reaches farther than a BCCH which is broadcasted.

Non-patent Document 1: "IEEE 802.16e-2005," [online], February 2006, [search on Feb. 1, 2007], internet URL: http://standards.ieee.org/getieee802/download/802.16e-2005.pd f>

DISCLOSURE OF THE INVENTION

Here, a radio signal for broadcast control channel (BCCH) and a radio signal for PCCH are affected by a scatter (a building, for example) located on a propagation path between a radio base station and a radio communication terminal. Thus, in general, the power at each of these radio signals received by the radio communication terminal varies periodically.

This periodic variation in the received power of the radio signal sometimes prevents the radio communication terminal from receiving a BCCH when the radio communication terminal is located near the fringe of a coil reached by the BCCH. Meanwhile, when channel allocation information is transmitted by using a BCCH, no PCCH to be transmitted by using a directional beam might be transmitted to the radio communication terminal. In other words, there has been a problem that, when located near the fringe of a cell reached by a BCCH, a radio communication terminal might become incapable of receiving any of the BCCH and the PCCH.

The present invention has been made in view of these circumstances, and an object thereof is to provide a radio base station and a channel allocation information transmission method that allow a radio communication terminal to receive channel allocation information more reliably even if the radio communication terminal is located near the fringe of a cell reached by a broadcast control channel.

The present invention has the following characteristics to solve the problems described above. First of all, a first characteristic of the present invention is summarized as a radio base station (radio base station 100) that transmits channel allocation information (broadcast MAP, private MAP) indicating allocation of a radio communication channel (sub-channel $CH_s$) to a radio communication terminal (radio communication terminal 200) by using a downlink frame (downlink frame F11, for example) including a broadcast control channel (sub-channel $CH_s$ of broadcast MAP region M11) broadcasted by using an omnidirectional beam and a dedicated control channel (sub-channel $CH_s$ of diversity MAP region M22) transmitted in a predetermined direction by using a directional beam (directional beam B1), the radio base station comprising: a propagation path characteristic acquisition unit (propagation path characteristic acquisition unit 105) configured to acquire a propagation path characteristic (SINR, for example) between the radio communication terminal and the radio base station; a notification unit (channel controller 107) configured to notify the radio communication terminal that the channel allocation information is to be transmitted by using the dedicated control channel, if the propagation path characteristic acquired by the propagation path characteristic acquisition unit satisfies, a predetermined condition; and a channel allocation information transmitter (channel controller 107, MAP processor 109) configured to transmit the channel allocation information by using the dedicated control channel (instead of the broadcast control channel) in the downlink frame (downlink frame F21, for example), after the notification unit notifies the radio communication terminal that the channel allocation information is to be transmitted by using the dedicated control channel.

The above-described radio base station determines whether or not to transmit channel allocation information by using the dedicated control channel, on the basis of the propagation path characteristics between the radio communication terminal and the radio base station. Being transmitted in the predetermined direction by using the directional beam, the dedicated control channel can reach farther than the broadcast control channel that is broadcasted by using the omnidirectional beam.

Thus, the above-described radio base station can transmit channel allocation information by using the dedicated control channel before the radio communication terminal becomes located near the fringe of a cell reached by the broadcast control channel, and thus before the propagation path characteristics between the radio communication terminal and the radio base station am deteriorated enough to disable the radio communication terminal from receiving the broadcast control channel. Accordingly, the radio base station allows the radio communication terminal to receive channel allocation information more reliably even if the radio communication terminal is located near the fringe of the cell reached by the broadcast control channel.

A second characteristic of the present invention is according to the first characteristic of the present invention and is summarized in that the channel allocation information transmitter transmits the channel allocation information by using the broadcast control channel and the dedicated control channel if the propagation path characteristic acquired by the propagation path characteristic acquisition unit satisfies a predetermined condition.

A third characteristic of the present invention is according to the second characteristic of the present invention and is summarized in that a receipt notification acquisition unit (channel controller 107) configured to acquire receipt notification from the radio communication terminal, the receipt notification indicating that the radio communication terminal has received the channel allocation information by using the dedicated control channel, wherein the channel allocation information transmitter cancels transmission of the channel allocation information by using the broadcast control channel if the receipt notification acquisition unit acquires the receipt notification.

A fourth characteristic of the present invention is summarized as a channel allocation information transmission method for transmitting channel allocation information indicating allocation of a radio communication channel, to a radio communication terminal by using a downlink frame including a broadcast control channel broadcasted by using an omnidirectional beam and a dedicated control channel transmitted in a predetermined direction by using a directional beam, the channel allocation information transmission method comprising the steps of: acquiring a propagation path characteristic between the radio communication terminal and the radio base station; notifying the radio communication terminal that the channel allocation information is to be transmitted by using the dedicated control channel, if the acquired propagation path characteristic satisfies a predetermined condition; and transmitting the channel allocation information by using the dedicated control channel (instead of the broadcast control channel) in the downlink frame, after the radio communication terminal is notified that the channel allocation information is to be transmitted by using the dedicated control channel.

A fifth characteristic of the present invention is according to the forth characteristic of the present invention and is summarized in that, in the step of transmitting the channel allocation information, the channel allocation information is transmitted by using the broadcast control channel and the dedicated control channel if the acquired propagation path characteristic satisfies a predetermined condition.

A sixth characteristic of the present invention is according to the fifth characteristic of the present invention and is summarized in that the channel allocation information transmission method further comprising the step of acquiring receipt notification from the radio communication terminal, the receipt notification indicating that the radio communication terminal has received the channel allocation information by using the dedicated control channel, wherein in the step of transmitting the channel allocation information, transmission of the channel allocation information by using the broadcast control channel is cancelled if the receipt notification is acquired.

In other words, according to the aspects of the present invention, a radio base station and a channel allocation information transmission method can be provided that allow a radio communication terminal to receive channel allocation information more reliably even if the radio communication terminal is located near the fringe of a cell reached by a broadcast control channel.

The present invention has the following characteristics to solve the problems described above. A seventh characteristic of the present invention is summarized as a radio base station (radio base station 1100) that transmits channel allocation information (broadcast MAP, private MAP) indicating allocation of a radio communication channel (sub-channel $CH_s$) to a radio communication terminal (radio communication terminal 1200) by using a downlink frame (downlink frame E11, for example) including a broadcast control channel (sub-channel $CH_s$ of broadcast MAP region M11) broadcasted by using an omnidirectional beam and a dedicated control channel (sub-channel $CH_s$ of diversity MAP region M22) transmitted in a predetermined direction by using a directional beam (directional beam B1), the radio base station comprising: a propagation path characteristic acquisition unit (propagation path characteristic acquisition unit 1105) configured to acquire a propagation path characteristic (SINR, for example) between the radio communication terminal and the radio base station; a notification unit (channel controller 1107) configured to notify the radio communication terminal that the channel allocation information is to be transmitted by using the broadcast control channel, if the propagation path characteristic acquired by the propagation path characteristic acquisition unit satisfies a predetermined condition; and a channel allocation information transmitter (channel controller 1107, MAP processor 1109) configured to transmit the channel allocation information by using the broadcast control channel (instead of the broadcast control channel) in the downlink frame (downlink frame F21, for example), after the notification unit notifies the radio communication terminal that the channel allocation information is to be transmitted by using the broadcast control channel.

The above-described radio base station determines whether or not to transmit channel allocation information by using the broadcast control channel, on the basis of the propagation path characteristics between the radio communication terminal and the radio base station.

Specifically, the above-described radio base station can cancel transmission of channel allocation information using the dedicated control channel when the radio communication terminal moves from the inside of a PCCH's reaching cell into a BCCH's reaching cell. This reduces frequency of transmitting channel allocation information by using both the broadcast control channel and the dedicated control channel.

Accordingly, regions that have been used for transmitting channel allocation information can be allocated to user data, and thus usage efficiency of downlink frames can be improved.

A eighth characteristic of the present invention is according to the seventh characteristic of the present invention and is summarized in that the channel allocation information transmitter transmits the channel allocation information by using the broadcast control channel and the dedicated control channel if the propagation path characteristic acquired by the propagation path characteristic acquisition unit satisfies a predetermined condition.

A ninth characteristic of the present invention is according to the eighth characteristic of the present invention and is summarized in that the radio base station further comprising a receipt notification acquisition unit (channel controller 1107) configured to acquire receipt notification from the radio communication terminal, the receipt notification indicating that the radio communication terminal has received the channel allocation information by using the broadcast control channel, wherein the channel allocation information transmitter cancels transmission of the channel allocation information by using the dedicated control channel if the receipt notification acquisition unit acquires the receipt notification.

A tenth characteristic of the present invention is summarized as a channel allocation information transmission method for transmitting channel allocation information indicating allocation of a radio communication channel, to a radio communication terminal by using a downlink frame including a broadcast control channel broadcasted by using an omnidirectional beam and a dedicated control channel transmitted in a predetermined direction by using a directional beam, the channel allocation information transmission method comprising the steps of: acquiring a propagation path characteristic between the radio communication terminal and the radio base station; notifying the radio communication terminal that the channel allocation information is to be transmitted by using the broadcast control channel, if the acquired propagation path characteristic satisfies a predetermined condition; and transmitting the channel allocation information by using the broadcast control channel (instead of the broadcast control channel) in the downlink frame, after the radio communication terminal is notified that the channel allocation information is to be transmitted by using the broadcast control channel.

A eleventh characteristic of the present invention is according to the tenth characteristic of the present invention and is summarized in that, in the step of transmitting the channel allocation information, the channel allocation information is transmitted by using the broadcast control channel and the dedicated control channel if the acquired propagation path characteristic satisfies a predetermined condition.

A twelfth characteristic of the present invention is according to the eleventh characteristic of the present invention and is summarized in that the channel allocation information transmission method further comprising the step of acquiring receipt notification from the radio communication terminal, the receipt notification indicating that the radio communication terminal has received the channel allocation information by using the broadcast control channel, wherein the step of transmitting the channel allocation information, transmission of the channel allocation information by using the dedicated control channel is canceled if the receipt notification is acquired.

Thus, according to the aspects of the present invention, a radio base station and a channel allocation information transmission method can be provided that are capable of improving usage efficiency of downlink frames, when the radio communication terminal moves from the inside of a PCCH's reaching cell into a BCCH's reaching cell formed inside the PCCH's reaching cell.

BEST MODES FOR CARRYING OUT THE INVENTION

Figure 1:
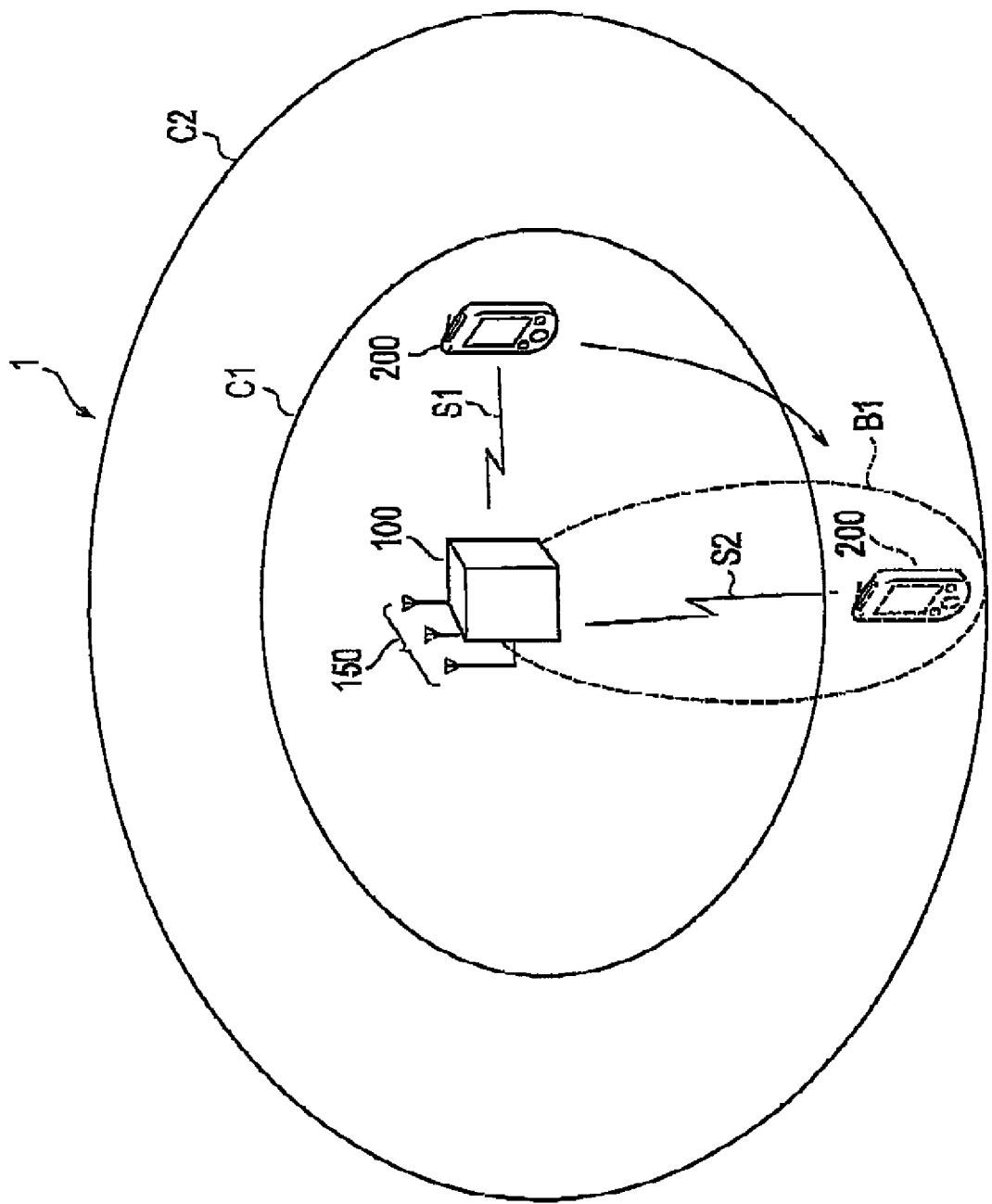
FIG. 1 shows an overall schematic configuration of a mobile communication system according to embodiments of the present invention.

Next, embodiments of the present invention will be described. Note that, in the following descriptions of the drawings, the same or similar components are denoted by the same or similar reference numerals. Note also that the drawings are only schematic, and thus that the dimensional ratios between the components and the like in the drawings are different from those in reality.

Thus, the specific dimensions and the like should be determined in consideration of the following descriptions. Needless to say, the dimensional relationships and ratios between the components are not consistent across the drawings.

First Embodiment

Overall Schematic Configuration of Mobile Communication System

FIG. 1 shows an overall schematic configuration of a mobile communication system 1 according to this embodiment. The mobile communication system 1 includes a radio base station 100 and radio communication terminals 200. Note that the number of radio base stations and the number of radio communication terminals included in the mobile communication system 1 are not limited to those shown in FIG. 1.

The mobile communication system 1 is based on mobile WiMAX specified in IEEE 802.16e. In this embodiment, the radio base station 1 is configured to transmit radio signals S1 and S2 based on orthogonal frequency-division multiplexing (OFDM) to the radio communication terminals 200.

The radio base station 100 includes an array antenna 150, and is thus capable of transmitting the radio signal S2 by using a directional beam B1. In addition, the radio base station 100 is also capable of transmitting the radio signal S1 by using an omnidirectional beam (not shown).

The radio base station 100 is configured to transmit channel allocation information, which is allocation information of sub-channels $CH_s$ (radio communication channels). Specifically, as the channel allocation information, the radio base station 100 transmits a broadcast MAP (DL-MAP and UL-MAP) by using the radio signal S1 or a private MAP (AAS-Diversity MAP) by using the radio signal S2.

The radio signal S1 using the omnidirectional beam reaches the radio communication terminal 200 located in a cell C1. Being beamformed, the radio signal S2 using the directional beam roaches farther than the omnidirectional beam, specifically reaches the radio communication terminal 200 located in a cell C2.

Each radio communication terminal 200 is configured to receive the radio signals S1 and S2 from the radio base station 100. The radio communication terminal 200 is a portable small terminal, and has a voice communication function and a data communication function (such as e-mail and FTP). In addition, the radio communication terminal 200 is configured to receive a broadcast MAP (DL-MAP and UL-MAP) transmitted using the radio signal S1 and a private MAP (AAS-diversity MAP) transmitted using the radio signal S2.

(Functional Block Configuration of Mobile Communication System)

Figure 2:
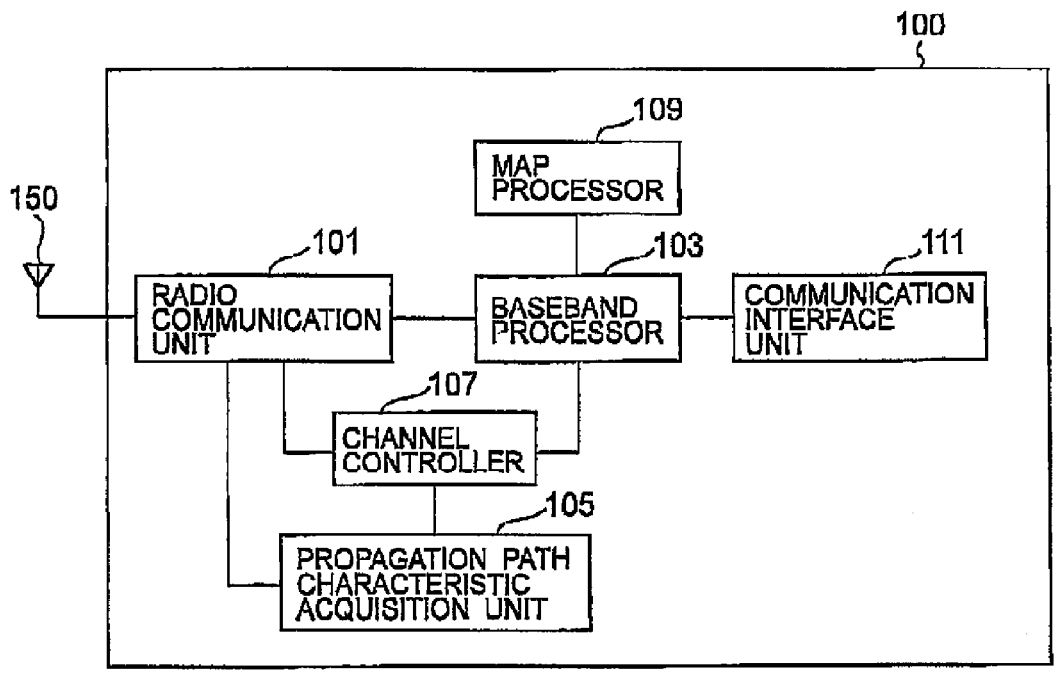
FIG. 2 shows a functional block configuration of a radio base station according to the embodiments of the present invention.
Figure 3:
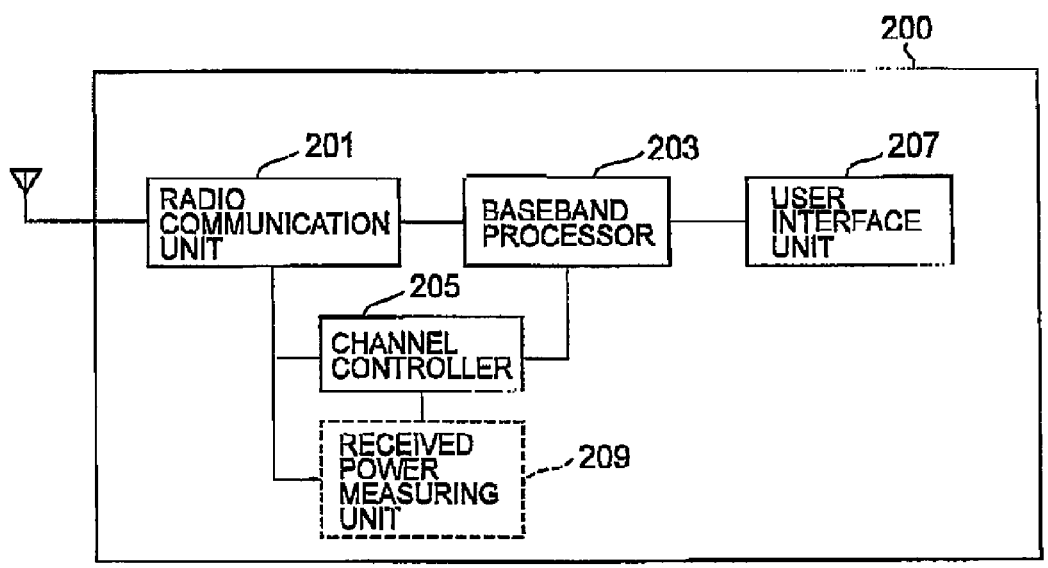
FIG. 3 shows a functional block configuration of a radio communication terminal according to the embodiments of the present invention.

Next, a functional block configuration of the mobile communication system 1 will be described. FIG. 2 shows a functional block configuration of the radio base station 100. FIG. 3 shows a functional block configuration of each radio communication terminal 200.

(1) Radio Base Station 100

As shown in FIG. 2, the radio base station 100 includes a radio communication unit 101, a baseband processor 103, a propagation path characteristic acquisition unit 105, a channel controller 107, a MAP processor 109 and a communication interface unit 111.

The radio communication unit 101 is configured to transmit the radio signals S1 and S2 in a predetermined frequency band (2.5 GHz band, for example) by using the array antenna 150. Specifically, the radio communication unit 101 is capable of forming the directional beam B1 or the omnidirectional beam by using the array antenna 150.

Figure 5:
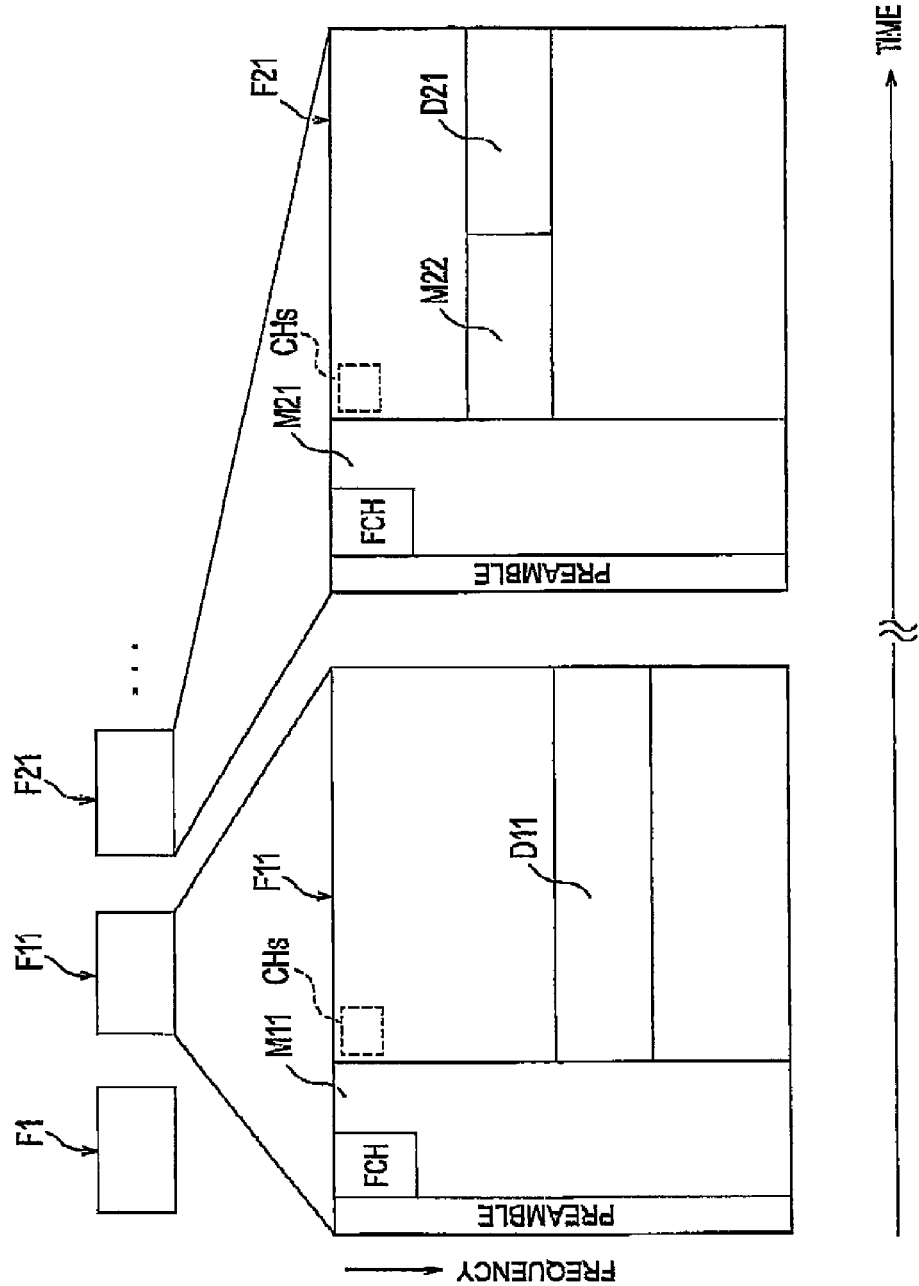
FIG. 5 shows a structure example of downlink frames used in the embodiments of the present invention.

In this embodiment, the radio base station 100 is configured to transmit downlink frames each having a structure as shown in FIG. 5 by using the radio signals S1 and S2. Note that the specific structure of each downlink frame will be described later.

The baseband processor 103 is connected to the radio communication unit 101. The baseband processor 103 is configured to transmit data, specifically, a baseband signal including data such as user data and control data, to the radio communication unit 101, and to demodulate the radio signals received from the radio communication unit 101 into baseband signals.

The propagation path characteristic acquisition unit 105 is configured to acquire propagation path characteristics between each radio communication terminal 200 and the radio base station 100. In this embodiment, the propagation path characteristic acquisition unit 105 is capable of acquiring path loss, received signal strength (RSSI), an amount of interference to a radio signal, and a signal to interference plus noise ratio (SINR), as propagation path characteristics from the radio communication terminal 200 to the radio base station 100, that is, uplink propagation path characteristics.

In addition, the propagation path characteristic acquisition unit 105 is capable of acquiring information indicating propagation path characteristics from the radio base station 100 to the radio communication terminal 200, that is, downlink propagation path characteristics, from the radio communication terminal 200.

The channel controller 107 is configured to perform allocation of the sub-channels $CH_s$ (see FIG. 5) included in each downlink frame. Here, FIG. 5 shows structures of the downlink frames that the radio base station 100 transmits to the radio communication terminals 200 by using the radio signals S1 and S2.

As shown in FIG. 5, the downlink frames include downlink frames F1, F11 and F21. The downlink frames F1, F11 and F21 are continuously and sequentially transmitted. The downlink frames subsequent to the downlink frame F21 each have a similar structure, and are also sequentially transmitted.

The downlink frame F11 includes a broadcast MAP region M11 and a data burst region D11.

The broadcast MAP region M11 includes a broadcast MAP, specifically, includes: a DL-MAP, which is allocation information of the sub-channels $CH_s$ in all the downlink frames; and an UL-MAP, which is allocation information of the sub-channels $CH_s$ in all uplink frames. In other words, the broadcast MAP region M11 includes allocation information of the sub-channels $CH_s$ for the radio communication terminals 200. The sub-channel $CH_s$ (broadcast control channel (BCCH)) of the broadcast MAP region M11 is broadcasted using the omnidirectional beam. Note that each sub-channel $CH_s$ is defined by a combination of frequency and time (timing).

The data burst region D11 includes user data and the like for the radio communication terminals 200. The sub-channel $CH_s$ of the data burst region D11 is transmitted in a predetermined direction by using the directional beam B1. Alternatively, the sub-channel $CH_s$ of the data burst region D11 may be omnidirectionally transmitted by using the omnidirectional beam.

Like the downlink frame F11, the downlink frame F21 includes a broadcast MAP region M21 and a data burst region D21. In addition, the downlink frame F21 includes a diversity MAP region M22. Note that the broadcast MAP region M21 does not include allocation information of the sub-channels $CH_s$ for the radio communication terminals 200.

The diversity MAP region M22 includes a private MAP, specifically, an AAS-Diversity MAP, which is allocation information of the sub-channels $CH_s$ for a specific one of the radio communication terminals. The sub-channels $CH_s$ (dedicated control channels (PCCHs)) of the diversity MAP region M22 and the data burst region D21 are transmitted in a predetermined direction by using the directional beam B1. Alternatively, the sub-channels $CH_s$ et the diversity MAP region M22 and the data burst region. D21 may be omnidirectionally transmitted by using the omnidirectional beam.

In this embodiment, if propagation path characteristics acquired by the propagation path characteristic acquisition unit 105 satisfy a predetermined condition, the channel controller 101 notifies the radio communication terminal 200, in a predetermined downlink frame (the downlink frame F11, for example), that a private MAP (channel allocation information) is to be transmitted in a downlink frame (the downlink frame F21, for example) that is to be transmitted after the predetermined downlink frame. In this embodiment, the channel controller 107 constitutes a notification unit.

For example, suppose that the propagation path characteristic acquisition unit 105 acquires information that an SINK falls below a predetermined threshold while the downlink frame F1 is transmitted. In this case, the channel controller 107 notifies the radio communication terminal 200, in the downlink frame F11 (predetermined downlink frame), that a private MAP (AAS-Diversity MAP) is to be transmitted in the downlink frame F21.

Specifically, the channel controller 107 transmits pointer a information (MS pointer) indicating the location of the diversity MAP region M22 in the downlink frame F21 by using a BCCH in the downlink frame F11.

Alternatively, the channel controller 107 may transmit channel allocation information, specifically, a broadcast MAP and a private MAP, by using a BCCH and a PCCH if propagation path characteristics acquired by the propagation path characteristic acquisition unit 105 satisfy a predetermined condition.

In addition, the channel controller 107 is capable or acquiring receipt notification from the radio communication terminal 200. The receipt notification indicator, that the radio communication terminal 200 has received a private MAP by using a PCCH. Note that the radio communication terminal 200 transmits the receipt notification in a predetermined position or an uplink frame (not shown) (by using a ranging channel, which is the sub-channel $CH_s$ of a region, used for ranging, in the broadcast MAP region M21, for example). In this embodiment, the channel controller 107 constitutes a receipt notification acquisition unit.

The channel controller 107 is capable of cancelling the transmission of a broadcast MAP using a BCCH when acquiring the receipt notification from the radio communication terminal 200.

The MAP processor 109 is configured to perform a process of generating a broadcast MAP and a private MAP. In this embodiment, in particular, the MAP processor 109 is capable of transmitting a private MAP by using a PCCH instead of a BCCH in a downlink frame (the downlink frame F21, for example). In this embodiment, the channel controller 107 and the MAP processor 109 constitute a channel allocation information transmitter.

The communication interface unit 111 provides a communication interface for connecting to a communication network (not shown) via which multiple radio base stations are connected.

(2) Radio Communication Terminal 200

As shown in FIG. 3, each radio communication terminal 200 includes a radio communication unit 201, a baseband processor 203, a channel controller 205 and a user interface unit 207.

The radio communication unit 201 is configured to receive the radio signals S1 and S2 in the predetermined frequency band (2.5 GHz band, for example).

The baseband processor 203 is connected to the radio communication unit 201. The baseband processor 203 is configured to transmit data, specifically, a baseband signal including data such as user data and control data, to the radio communication unit 201, and to demodulate the radio signals S1 and S2 received from the radio communication unit 201 into baseband signals.

The channel controller 205 is configured to select an appropriate one of the sub-channels $CH_s$ based on a broadcast MAP included in the radio signal S1 or a private MAP included in the radio signal S2, which are received from the radio base station 100. In addition, the channel controller 205 is configured to make a control to cause the radio communication unit 201 and the baseband processor 203 to perform radio communications with the radio base station 100 by using the selected sub-channel $CH_s$.

In addition, the channel controller 205 is capable of transmitting receipt notification to the radio base station 100. The receipt notification indicates that the radio communication unit 201 has received a private MAP by using a PCCH. Moreover, the channel controller 205 is capable of transmitting information indicating propagation path characteristics from the radio base station 100 to the radio communication terminal 200, that is, downlink propagation path characteristics, to the radio base station 100.

The user interface unit 207 provides a user interface (including operation keys, a display, a microphone and a loudspeaker) which is necessary for the user of the radio communication terminal 200 to use the radio communication terminal 200.

(Operation of Mobile Communication System)

Next, an operation of the mobile communication system 1 will be described. Specifically, the description will be given of an operation that the radio base station 100 switches from broadcast MAP transmission using the omnidirectional beam no private MAP transmission using the directional beam B1, on the basis of propagation path characteristics between the radio base station 100 and the radio communication terminal 200.

(1) Operation Example 1

Figure 4:
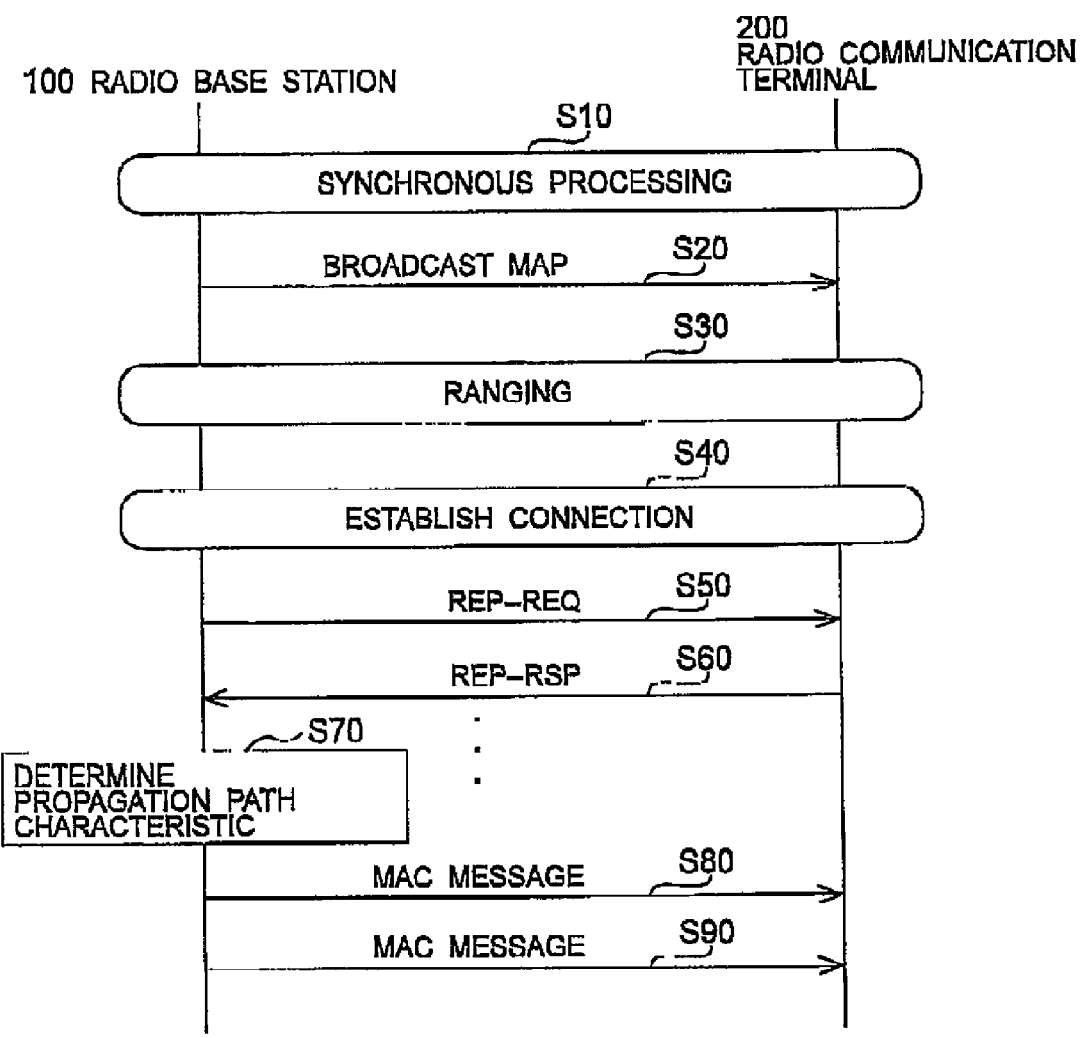
FIG. 4 shows an operational flow in which the radio base station according to the embodiments of the present invention switches from broadcast MAP transmission to private MAP transmission.

FIG. 4 shows an operational flow in which the radio base station 100 switches from broadcast MAP transmission to private MAP transmission.

As shown in FIG. 4, in step S10, the radio base station 100 and the radio communication terminal 200 perform synchronous processing. By performing this synchronous processing, the radio communication terminal 200 becomes capable or receiving downlink frames transmitted by the radio base station 100.

In step S20, the radio base station 100 broadcasts a broadcast MAP by using the omnidirectional beam.

In step S30, the radio base station 100 and the radio communication terminal 200 perform ranging processing. Specifically, based on allocation information of a ranging channel included in the broadcast MAP, the radio communication terminal 200 performs processing such as adjusting timing of uplink data transmission in accordance with the location of the radio communication terminal 200.

In step S40, the radio base station 100 and the radio communication terminal 200 perform connection establish processing. Specifically, the radio base station 100 and the radio communication terminal 200 establish communication connection between the radio base station 100 and the radio communication terminal 200.

In step S50, the radio base station 100 transmits a report request (REP-REQ) to the radio communication terminal 200.

In step S60, based on the REP-REQ received from the radio base station 100, the radio communication terminal 200 transmits a report response (REP-RES), which is a response to the REP-REQ, to the radio base station 100. The REP-RES includes information indicating the propagation path characteristics between the radio base station 100 and the radio communication terminal 200, such as an SINR.

In step S70, the radio base station 100 performs determination on the propagation path characteristics between the radio base station 100 and the radio communication terminal 200. Specifically, the radio base station 100 determines whether or not the propagation path characteristics between the radio base station 100 and the radio communication terminal 200 satisfy the predetermined condition. For the SINR, for example, the radio base station 100 determines whether or not the SINR falls below the predetermined threshold. Assume here that the propagation path characteristics satisfy the predetermined condition.

In step, s80, the radio base station 100 notifies the radio communication terminal 200 that a private MAP (AAS-Diversity MAP) is to be transmitted. Specifically, the radio base station 100 transmits pointer information (AAS pointer) indicating the location of the diversity MAP region M22 in the downlink frame 121 by using a BCCH in a downlink frame. The BCCH used here is, so for example, a BCCH in the downlink frame F11 (see FIG. 5), namely, the sub-channel $CH_s$ of the broadcast MAP region M11.

In step S90, the radio base station 100 transmits a private MAP, specifically, an AAS-Diversity MAP for the radio communication terminal 200, to the radio communication terminal 200 by using the diversity MAP region M22 in the downlink frame F21. Note that the AAS pointer indicating the location of the data burst region D21 is included in the broadcast MAP region M21 or the diversity MAP region M22.

The sub-channels $CH_s$ (PCCHs) of the diversity MAP region M22 and the data burst region D21 are transmitted in a predetermined direction by using the directional beam B1. In other words, the propagation path characteristic (SINR) of each PCCH transmitted by using the directional beam B1 is controlled so as to be more favorable than that of each BCCH broadcasted by using the omnidirectional beam.

(2) Operation Example 2

Figure 6:
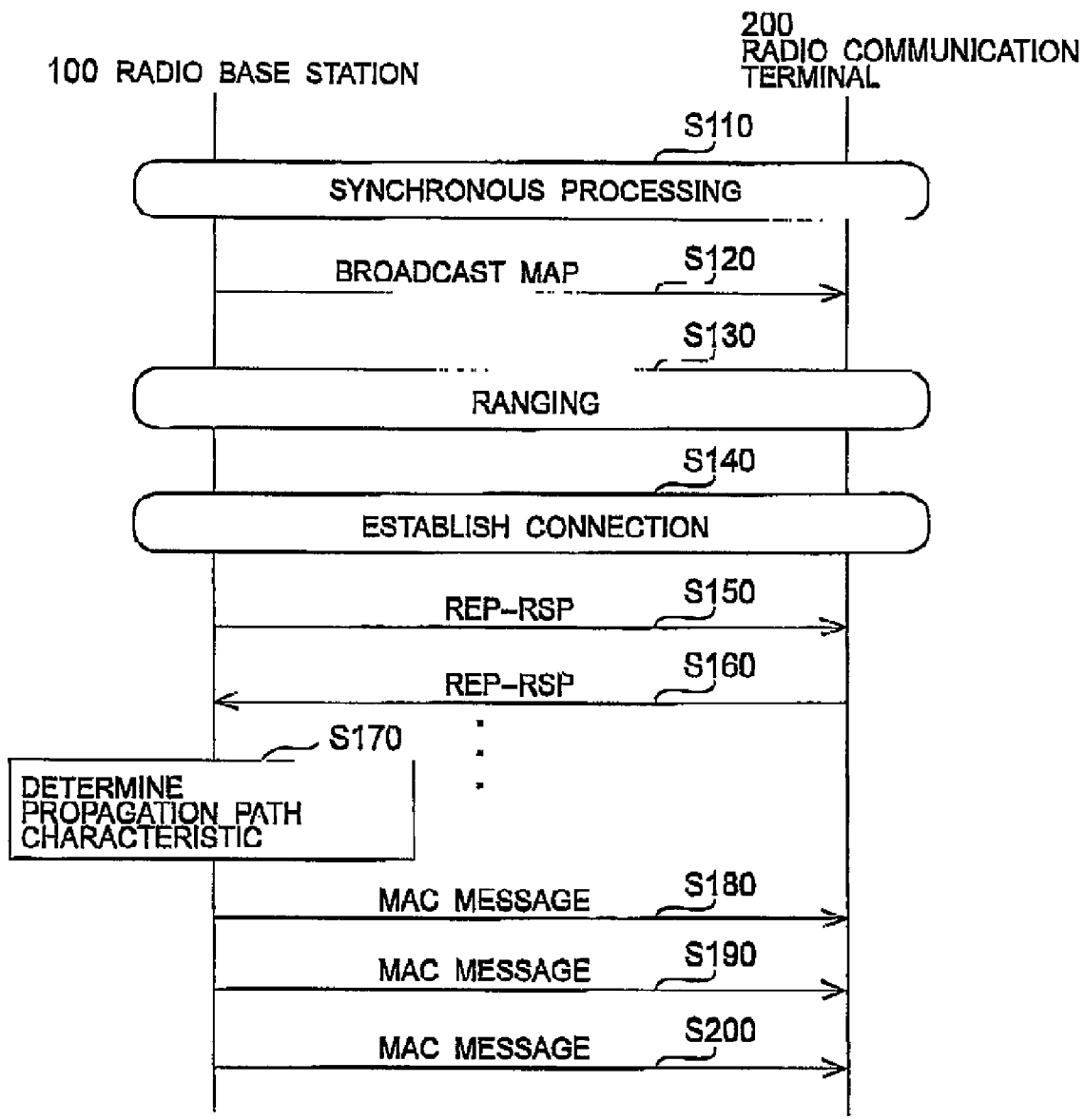
FIG. 6 shows another operational flow in which the radio base station according to the embodiments of the present invention switches from broadcast MAP transmission to private MAP transmission.

FIG. 6 shows another operational, flow in which the radio base station 100 switches tram broadcast MAP transmission to private MAP transmission. In the operational flow shown in FIG. 6, both a private MAP for the radio communication terminal 200 and a broadcast MAP are transmitted in a single downlink frame. In other words, the radio communication terminal 200 needs only to receive either the private MAP or the broadcast MAP, which can improve MAP (channel allocation information) acquisition probability of the radio communication terminal 200.

Figure 7:
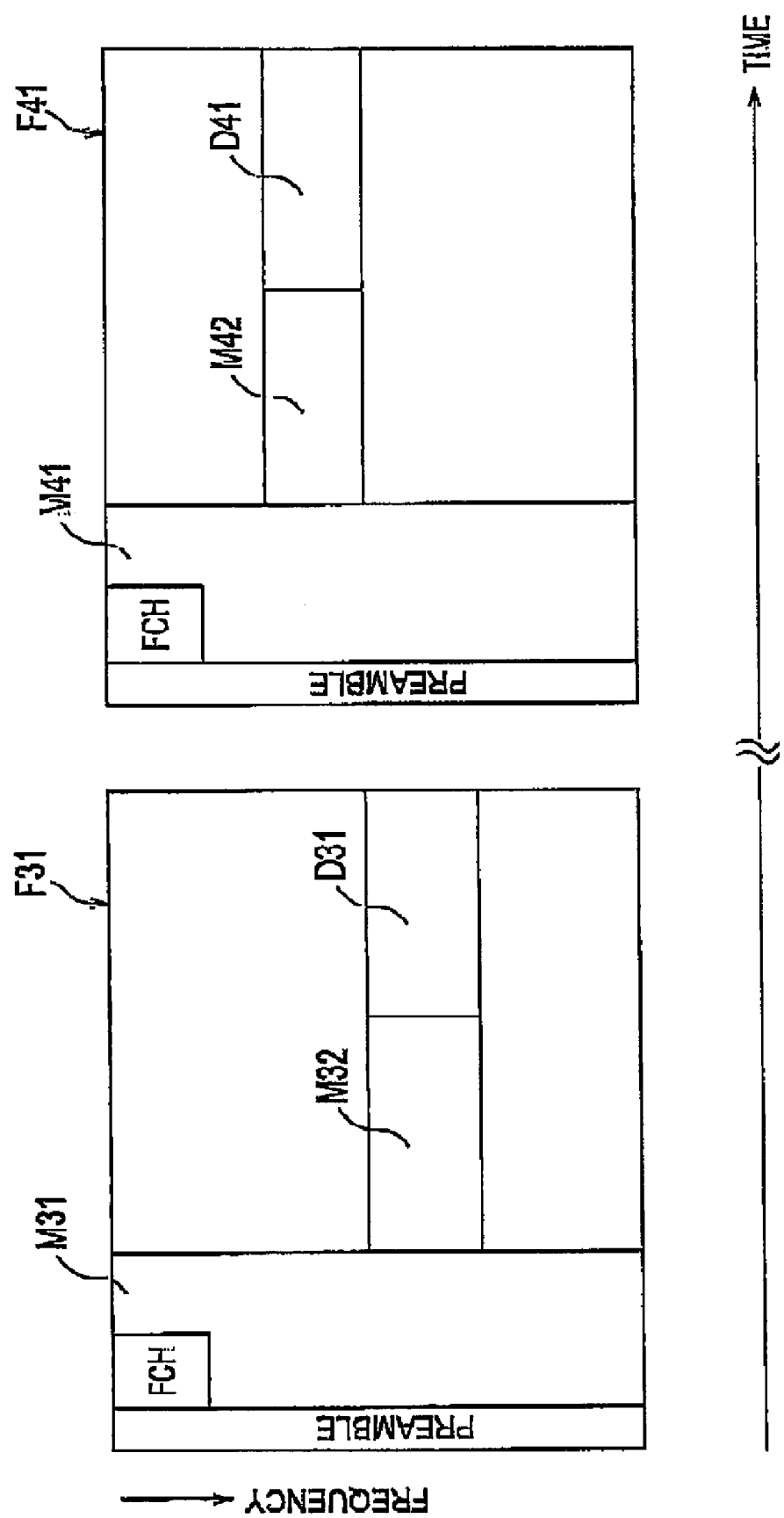
FIG. 7 shows another structure example of downlink frames used in the embodiments of the present invention.

In this operation example, used are downlink frames having different structures from those of the downlink frames F11 and F21 shown in FIG. 5. Specifically, downlink frames F31 and F41 shown in FIG. 7 are used. Hereinafter, differences from the downlink frames F11 and F21 will be mainly described.

As shown in FIG. 7, the downlink frame F31 includes a broadcast MAP region M31. In addition, the downlink frame F31 further includes a diversity MAP region M32 and a data burst region D31.

The broadcast MAP region M31 includes an AAS pointer that indicates the location of a private MAP for the radio communication terminal 200 included in the diversity MAP region M32.

In addition to the private MAP for the radio communication terminal 200, the diversity MAP region M32 further includes an AAS pointer that indicates the location of a private MAP for the radio communication terminal 200 included in a diversity MAP region M42 of the downlink frame F41.

The downlink frame F41 is equivalent to the downlink frame F21. The downlink frame r41 includes a broadcast MAP region M41, the diversity MAP region M42 and a data burst region D41.

The operation in steps S110 to S170 shown in FIG. 6 is the same as that in steps S10 to S70 shown in FIG. 4. In step S180, the radio base station 100 transmits a broadcast MAP. In this event, the radio base station 100 puts an AAS pointer indicating the location of a private MAP for the radio communication terminal 200 in a broadcast MAP region (the broadcast MAP region M31, for example).

In addition, the radio base station 100 puts the private MAP for the radio communication terminal 200 at the location, specifically, in the diversity MAP region (the diversity MAP region M32, for example), indicated by the AAS pointer.

Moreover, in step S190, the radio base station 100 also puts, in this diversity MAP region, an AAS pointer indicating the location of a private MAP for the radio communication terminal 200 included in the diversity MAP region M42 of a downlink frame to be transmitted next (the downlink frame F41, for example).

In step S200, the radio base station 100 transmits the AAS-Diversity MAP for the radio communication terminal 200 to the radio communication terminal 200 by using the diversity MAP region M42 of the downlink frame F41.

Note that, after the operation in step S200, the radio communication terminal 200 may transmit receipt notification indicating reception of the private MAP, to the radio base station 100. The radio base station 100 can cancel transmission of the broadcast MAP when acquiring the receipt notification from the radio communication terminal 200.

EFFECTS AND ADVANTAGES

In the mobile communication system 1, based on the propagation path characteristics between the radio communication terminal 200 and the radio base station 100, the radio base station 100 determines whether or not to transmit a private MAP (channel allocation information) by using a PCCH. Being transmitted in a predetermined direction by using the directional beam B1, a PCCH can reach farther than a BCCH broadcasted by using the omnidirectional beam.

Specifically, in the mobile communication system 1, channel allocation information can be transmitted by using a PCCH before the radio communication terminal 200 becomes located near the fringe of a cell reached by a BCCH, and thus before the propagation path characteristics between the radio communication terminal 200 and the radio base station 100 are deteriorated enough to disable the radio communication terminal 200 from receiving the BCCH. Accordingly, the mobile communication system 1 allows the radio communication terminal 200 to receive channel allocation information more reliably even if the radio communication terminal 200 is located near the fringe or the cell reached by a BCCH.

In this embodiment, channel allocation information is transmitted by using both a BCCH and a PCCH if the propagation path characteristics between the radio communication terminal 200 and the radio base station 100 satiety the predetermined condition. In other words, a private MAP for the radio communication terminal 200 and a broadcast MAP can be transmitted in a single downlink frame. This can further improve MAP (channel allocation information) acquisition probability of the radio communication terminal 200.

Moreover, in this embodiment, the radio base station 100 is capable of cancelling transmission of a broadcast MAP when acquiring receipt notification indicating reception of a private MAP from the radio communication terminal 200. Accordingly, channel allocation information is less likely to be redundantly transmitted to the radio communication terminal 200, and thus more regions in downlink frames can be allocated to user data and the like. In other words, usage efficiency of downlink frames is improved.

Other Embodiments

Hereinabove, the subject matters of the present invention to have been disclosed using an embodiment of the present invention. However, it should not be understood that any of the descriptions and the drawings which form part of this disclosure limits the present invention. Various alternative embodiments will be apparent to those skilled in the art from the disclosure.

For example, though both a private MAP for the radio communication terminal 200 and a broadcast MAP are transmitted in a single downlink frame in the foregoing embodiment, the radio communication terminal 200 may alternatively be configured to perform diversity reception between a BCCH used for transmitting a broadcast MAP and a PCCH used for transmitting a private MAP.

Specifically, each radio communication terminal 200 includes a received power measuring unit 209 (see FIG. 3) to perform diversity reception between a BCCH and a PCCH.

The received power measuring unit 209 is configured to measure a received power value per unit information volume of each of a BCCH and a PCCH that the radio communication unit 201 receives. The received power measuring unit 209 is configured to notify the channel controller 205 of one of these control channels that has the higher received power value per unit information volume thus measured.

The channel controller 205 selects channel allocation information (broadcast MAP or private MAP) that is to be transmitted by using the control channel (BCCH or PCCH) thus notified of.

As described above, the present invention includes various other embodiments and the like not described herein as a matter of course. Hence, the technical scope of the present invention is only defined by the features of the present invention according to the scope of claims based on the above descriptions.

Second Embodiment

Next, a second embodiment of the present invention will be described. A conventional channel allocation information transmission, method has the following problems. Specifically, since a radio base station is configured to transmit channel allocation information by using both a BCCH and a PCCH, the channel allocation information transmitted by using either of these channels is left unused. This leads to problems such as deteriorating usage efficiency of downlink frames.

Here, when the radio communication terminal moves from the inside of a cell reached by a PCCH (hereinafter referred to as PCCH's reaching cell) into a BCCH's reaching cell formed inside the PCCH's reaching cell, the radio communication terminal becomes capable of receiving a BCCH that is transmitted for general radio communication terminals by using an omnidirectional beam. In this case in particular, channel allocation information included in the PCCH transmitted for a specified radio communication terminal by using a directional beam is left unused.

With this background, another object of the present invention is to provide a radio base station and a channel allocation information transmission method that are capable of improving usage efficiency of downlink frames when the radio communication terminal moves from the inside of a PCCH's reaching cell into a BCCH's reaching cell formed inside the PCCH's reaching cell.
(Overall Schematic Configuration of Mobile Communication System)

Figure 8:
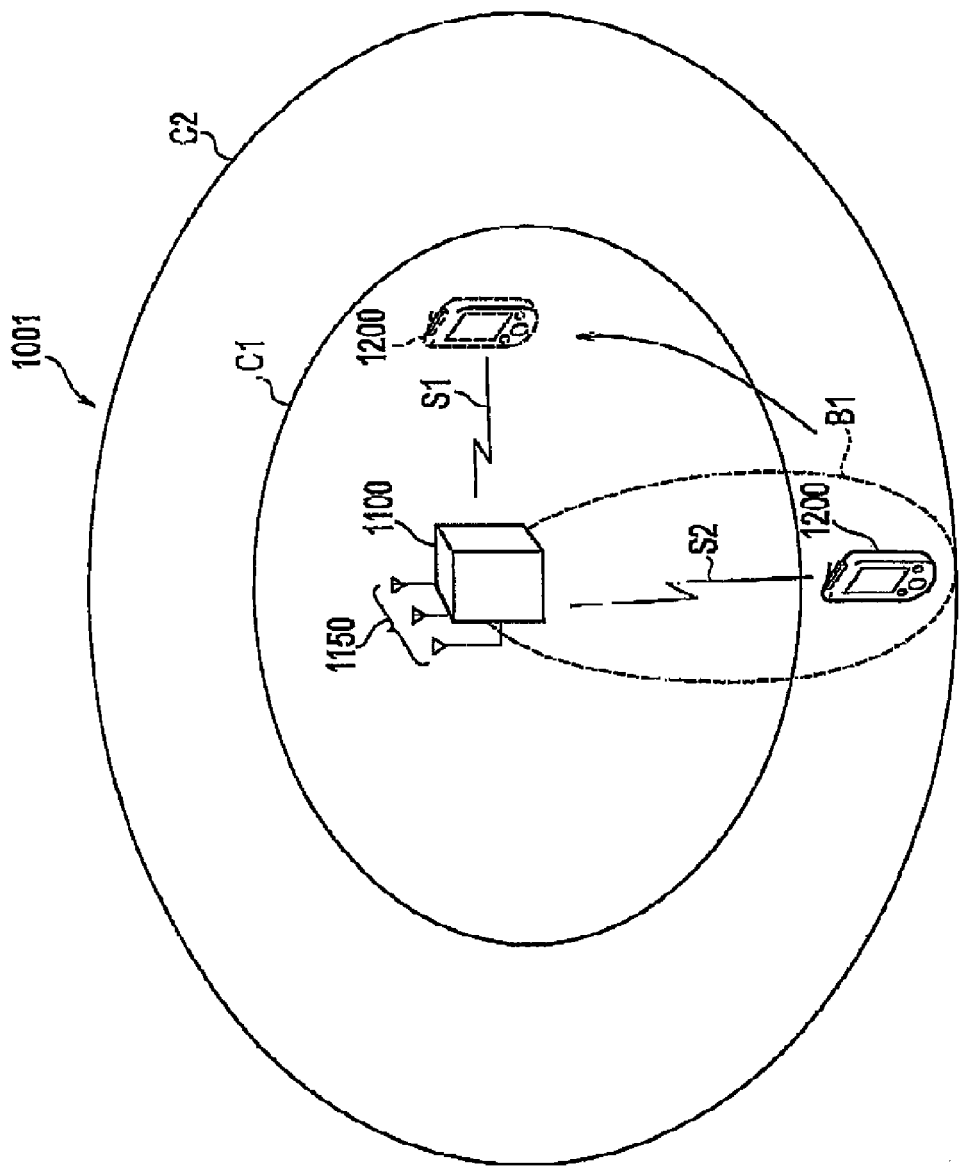
FIG. 8 shows an overall schematic configuration of a mobile communication system according to embodiments of the present invention.

FIG. 8 shows an overall schematic configuration of a mobile communication system 1000 according to this embodiment. The mobile communication system 1000 includes a radio base station 1100 and radio communication terminals 1200. Note that the number of radio base stations and the number of radio communication terminals included in the mobile communication system 1000 are not limited to those shown in FIG. 8.

The mobile communication system 1000 is based on mobile WiMAX specified in IEEE 802.16e. In this embodiment, the radio base station 1100 is configured to transmit radio signals S1 and S2 based on orthogonal frequency-division multiplexing (OFDM) to the radio communication terminals 1200.

The radio base station 1100 includes an array antenna 1150, and is thus capable of transmitting the radio signal S2 by using a directional beam B1. In addition, the radio base station 1100 is also capable of transmitting the radio signal S1 by using an omnidirectional beam (not shown).

The radio base station 1100 is configured to transmit channel allocation information, which is allocation information of sub-channels $CH_s$ (radio communication channels). Specifically, as the channel allocation information, the radio base station 1100 transmits a broadcast MAP (DL-MAP and UL-MAP) by using the radio signal S1 or a private MAP (AAS-Diversity Map) by using the radio signal S2.

The radio signal S1 using the omnidirectional beam reaches the radio communication terminal 1200 located in a cell C1 (BCCH's reaching cell). Being beamformed, the radio signal S2 using the directional beam reaches farther than the omnidirectional beam, specifically reaches the radio communication terminal 1200 located in a cell C2 (PCCH's reaching cell).

Each radio communication terminal 1200 is configured to receive the radio signals S1 and S2 from the radio base station 1100. The radio communication terminal 1200 is a portable small terminal, and has a voice communication function and a data communication function (such as e-mail and FTP). In addition, the radio communication terminal 1200 is configured to receive a broadcast MAP (DL-MAP and UL-MAP) transmitted using the radio signal S1 and a private MAP (AAS-Diversity Map) transmitted using the radio signal S2.
(Functional Block Configuration of Mobile Communication System)

Figure 9:
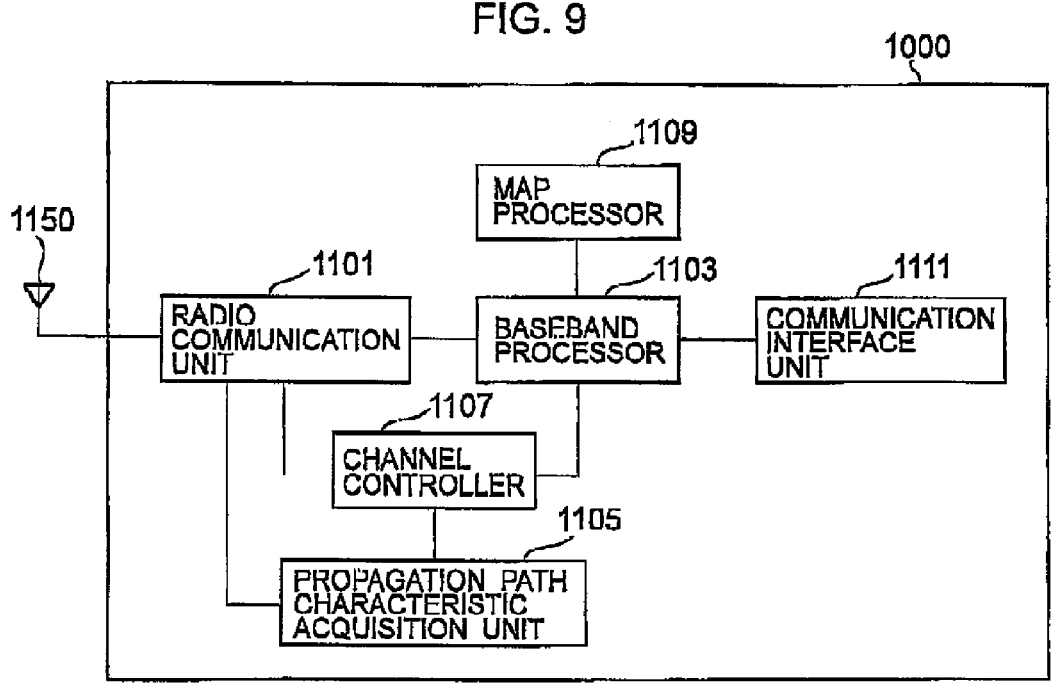
FIG. 9 shows a functional block configuration of a radio base station according to the embodiments of the present invention.
Figure 10:
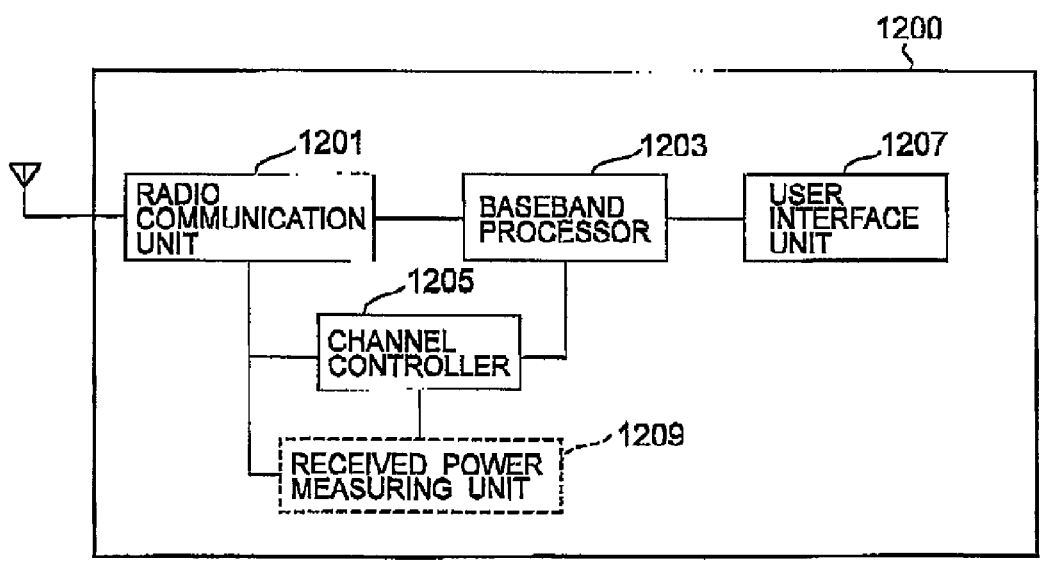
FIG. 10 shows a functional block configuration of a radio communication terminal according to the embodiments of the present invention.

Next, a functional block configuration of the mobile communication system 1000 will be described. FIG. 9 shows a functional block configuration of the radio base station 1100. FIG. 10 shows a functional block configuration of each radio communication terminal 1200.
(1) Radio Base Station 1100

As shown in FIG. 9, the radio base station 1100 includes a radio communication unit 1101, a baseband processor 1103, a propagation path characteristic acquisition unit 1105, a channel controller 1107, a MAP processor 1109 and a communication interface unit 1111.

The radio communication unit 1101 is configured to transmit the radio signals S1 and S2 in a predetermined frequency band (2.5 GHz band, for example) by using the array antenna 1150. Specifically, the radio communication unit 1101 is capable of forming the directional beam B1 or the omnidirectional beam by using the array antenna 1150.

Figure 12:
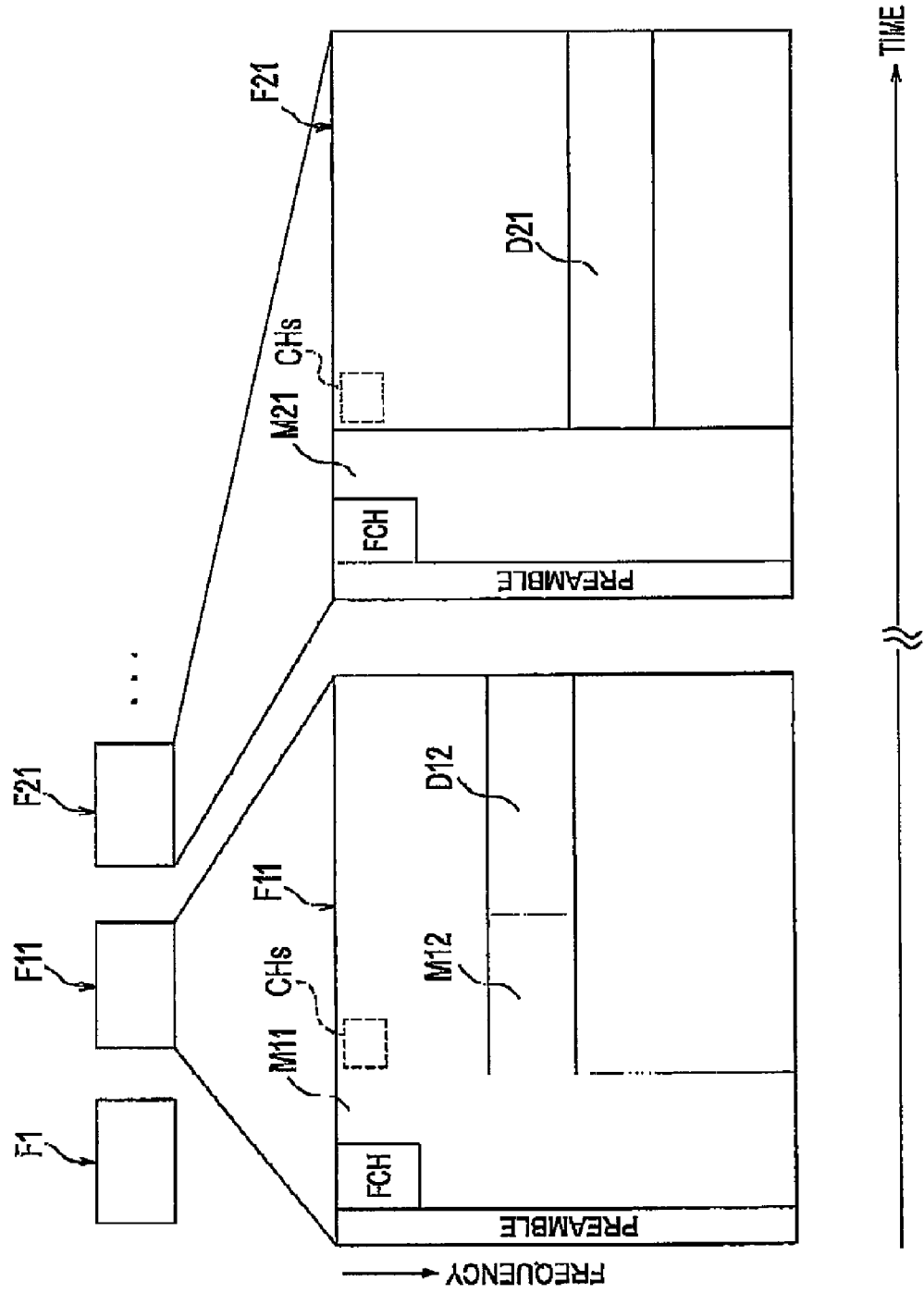
FIG. 12 shows a structure example of downlink frames used in the embodiments of the present invention.

In this embodiment, the radio base station 1100 is configured to transmit downlink frames each having a structure as shown in FIG. 12 by using the radio signals S1 and S2. Note that the specific structure of each downlink frame will be described later.

The baseband processor 1103 is connected to the radio communication unit 1101. The baseband processor 1103 is configured to transmit data, specifically, a baseband signal including data such as user data and control data, to the radio communication unit 1101, and to demodulate the radio signals received from the radio communication unit 1101 into baseband signals.

The propagation path characteristic acquisition unit 1105 is configured to acquire propagation path characteristics between each radio communication terminal 1200 and the radio base station 1100. In this embodiment, the propagation path characteristic acquisition unit 1105 is capable of acquiring path loss, received signal strength (RSSI), an amount of interference to a radio signal, and a signal to interference plus noise ratio (SINR), as propagation path characteristics from the radio communication terminal 1200 to the radio base station 1100, that is, uplink propagation path characteristics.

In addition, the propagation path characteristic acquisition unit 1105 is capable of acquiring information indicating propagation path characteristics from the radio base station 1100 to the radio communication terminal 1200, that is, downlink propagation path characteristics, from the radio communication terminal 1200.

The channel controller 1107 is configured to perform, for example, allocation of the sub-channels $CH_s$ (see FIG. 12) included in each downlink frame. Here, FIG. 12 shows structures of the downlink frames that the radio base station 1100 transmits to the radio communication terminals 1200 by using the radio signals S1 and S2.

As shown in FIG. 12, the downlink frames include downlink frames F1, F11 and F21. The downlink frames F1, F11 and F21 are continuously and sequentially transmitted. The downlink frames subsequent to the downlink frame F21 each have a similar structure, and are also sequentially transmitted.

The downlink frame F11 includes a broadcast MAP region M11, a diversity MAP region M12 and a data burst region D12.

The broadcast MAP region M11 includes a broadcast MAP, specifically, includes: a DL-MAP, which is allocation information of the sub-channels $CH_s$ in all the downlink frames; and an UL-MAP, which is allocation information or the sub-channels $CH_s$ in all uplink frames. The sub-channel $CH_s$ (broadcast control channel (BCCH)) of the broadcast MAP region mil is broadcasted using the omnidirectional beam. The broadcast MAP region M11 needs not necessarily include allocation information of the sub-channels $CH_s$ for the radio communication terminals 1200. Note that each sub-channel $CH_s$ is defined by a combination of frequency and time (timing).

The diversity MAP region M12 includes a private MAP, specifically, an AAS-Diversity MAP, which is allocation information of the sub-channels $CH_s$ for one of the radio communication terminals 1200. The data burst region D12 includes as user data and the like for the radio communication terminals 1200.

The sub-channels $CH_s$ (dedicated control channels (PCCHs)) of the diversity MAP region M12 and the data burst region D12 are transmitted in a predetermined direction by using the directional beam B1. Alternatively, the sub-channels $CH_s$ of the diversity MAP region M12 and the data burst region D12 may be omnidirectionally transmitted by using the omnidirectional beam.

Like the downlink frame F11, the downlink frame F21 includes a broadcast MAP region M21. In addition, the downlink frame F21 includes a data burst region D21.

The data burst region D21 includes user data and the like for the radio communication terminals 1200. The sub-channel $CH_s$ of the data burst region D21 is transmitted in a predetermined direction by using the directional beam B1. Alternatively, the sub-channel $CH_s$ of the data burst region D21 may be omnidirectionally transmitted by using the omnidirectional beam.

In this embodiment, if propagation path characteristics acquired by the propagation path characteristic acquisition unit 1105 satisfy a predetermined condition, the channel controller 1107 notifies the radio communication terminal 1200, in a predetermined downlink frame (the downlink frame F11, for example), that a broadcast MAP, specifically, a DL-MAP and a UL-MAP including channel allocation information for the radio communication terminals 1200 is to be transmitted in a downlink frame (the downlink frame F21, for example) that is to be transmitted after the predetermined downlink frame. In this embodiment, the channel controller 1107 constitutes a notification unit.

For example, suppose that the propagation path characteristic acquisition unit 1105 acquires information that the SINR falls below a predetermined threshold while the downlink so frame F1 is transmitted. In this case, the channel controller 1107 notifies the radio communication terminal 1200, in the downlink frame F11 (predetermined downlink frame), that a DL-MAP and a UL-MAP, including channel allocation information for the radio communication terminal 1200 is to be transmitted in the downlink frame F21.

Specifically, by using a PCCH in the downlink frame F11, the channel controller 1107 notifies that the DL-MAP and the UL-MAP including channel allocation information for the radio communication terminal 1200 is to be transmitted.

Alternatively, the channel controller 1107 may transmit channel allocation information, specifically, a broadcast MAP and a private MAP, by using a BCCH and a PCCH if propagation path characteristics acquired by the propagation path characteristic acquisition unit 1105 satisfy the predetermined condition.

In addition, the channel controller 1107 is capable of acquiring receipt notification from the radio communication terminal 1200. The receipt notification indicates that the radio communication terminal 1200 has received a broadcast MAP by using a BCCH. Note that the radio communication terminal 1200 transmits the receipt notification in a predetermined position of an uplink frame (not shown) (by using a ranging channel, which is a sub-channel $CH_s$ of a region, used for ranging, in the broadcast MAP region M21, for example). In this embodiment, the channel controller 1107 constitutes a receipt notification acquisition unit.

The channel controller 1107 is capable of cancelling the transmission of a private MAP using a PCCH when acquiring the receipt notification from the radio communication terminal 1200.

The MAP processor 1109 is configured to perform a process of generating a broadcast MAP and a private MAP. In this embodiment, in particular, the MAP processor 1109 is capable of transmitting channel allocation information for the radio communication terminal 1200 by using a BCCH instead of a PCCH in a downlink frame (the downlink frame F21, for example). In this embodiment, the channel controller 1107 and the MAP processor 1109 constitute a channel allocation information transmitter.

The communication interface unit 1111 provides a communication interface for connecting to a communication network (not shown) via which multiple radio base stations are connected.

(2) Radio Communication Terminal 1200

As shown in FIG. 10, each radio communication terminal 1200 includes a radio communication unit 1201, a baseband processor 1203, a channel controller 1205 and a user interface unit 1207.

The radio communication unit 1201 is configured to receive the radio signals S1 and S2 in the predetermined frequency band (2.5 GHz band, for example).

The baseband processor 1203 is connected to the radio communication unit 1201. The baseband processor 1203 is configured to transmit data, specifically, a baseband signal including data such as user data and control data, to the radio communication unit 1201, and to demodulate the radio signals S1 and S2 received from the radio communication unit 1201 into baseband signals.

The channel controller 1205 is configured to select en appropriate one at the sub-channels $CH_s$ based on a broadcast MAP included in the radio signal S1 or a private MAP included in the radio signal S2, which are received from the radio base station 1100. In addition, the channel controller 1205 is configured to make a control to cause the radio communication unit 1201 and the baseband processor 1203 to perform radio communications with the radio base station 1100 by using the selected sub-channel $CH_s$.

In addition, the channel controller 1205 is capable of transmitting receipt notification to the radio base station 1100. The receipt notification indicates that the radio communication unit 1201 has received a broadcast MAP by using a BCCH. Moreover, the channel controller 1205 is capable of transmitting information indicating propagation path characteristics from the radio base station 1100 to the radio communication terminal 1200, that is, downlink propagation path characters sties, to the radio base station 1100.

The user interface unit 1207 provides a user interface (including operation keys, a display, a microphone and a loudspeaker) which is necessary for the user of the radio communication terminal 1200 to use the radio communication terminal 1200.

(Operation of Mobile Communication System)

Next, an operation of the mobile communication system 1000 will be described. Specifically, the description will be given of an operation performed when the radio communication terminal 1200 moves from the inside of the cell C2 into the cell C1 formed inside the cell C2.

More specifically, the description will be given of an operation that, based on the propagation path characteristics between the radio communication terminal 1200 and the radio base station 1100, the radio base station 1100 cancels transmission of a private MAP by using the directional beam B1, and puts channel allocation information for the radio communication terminal 1200 in a broadcast MAP transmitted by using the omnidirectional beam.

(1) Operation Example 1

Figure 11:
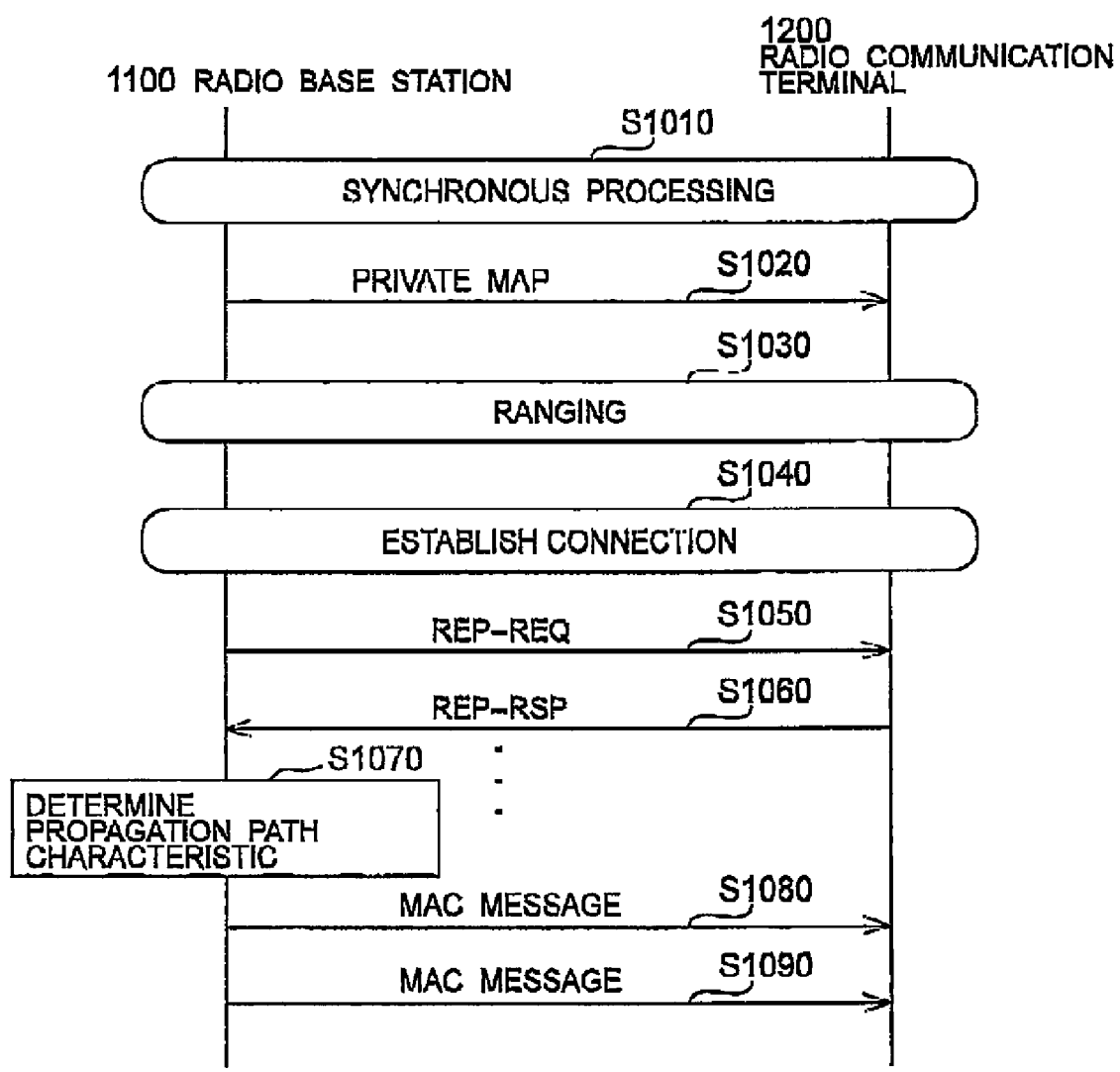
FIG. 11 shows an operational flow in which the radio base station according to the embodiments of the present invention cancels transmission of a private MAP, and puts channel allocation information for the radio communication terminal in a broadcast MAP.

FIG. 11 shows an operational flow in which the radio base station 1100 cancels transmission of a private MAP, and puts channel allocation information for the radio communication terminal 1200 in a broadcast map.

As shown FIG. 11, in step S1010, the radio base station 1100 and the radio communication terminal 1200 perform synchronous processing. By performing this synchronous processing, the radio communication terminal 1200 becomes capable of receiving downlink frames transmitted by the radio base station 1100.

In step S1020, the radio base station 1100 transmits a private MAP to the radio communication terminal 1200 by using the directional beam.

In step S1030, the radio bass station 1100 and the radio communication terminal 1200 perform ranging processing. Specifically, based on allocation information of a ranging channel included in the private MAP, the radio communication terminal 1200 performs processing such as adjusting timing of uplink data transmission in accordance with the location of the radio communication terminal 1200.

In step S1040, the radio base station 1100 and the radio communication terminal 1200 perform connection establish processing. Specifically, the radio base station 1100 and the radio communication terminal 1200 establish communication connection between the radio base station 1100 and the radio communication terminal 1200.

In step S1050, the radio base station 1100 transmits a report request (REP-REQ) to the radio communication terminal 1200.

In step S1060, based on the REP-REQ received from the radio base station 1100, the radio communication terminal 1200 transmits a report response (REP-RES), which is a response to The REP-REQ, to the radio base station 1100. The REP-RES includes information indicating the propagation path characteristics between the radio base station 1100 and the radio communication terminal 1200, such as an SINR.

In step S1070, the radio base station 1100 performs determination on the propagation path characteristics between the radio base station 1100 and the radio communication terminal 1200. Specifically, the radio hasp station 1100 determines whether or not the propagation path characteristics between the radio base station 1100 and the radio communication terminal 1200 satisfy the predetermined condition. For the SINR, for example, the radio base station 1100 determines whether or not the SINE exceeds the predetermined threshold. Assume here that the propagation path characteristics satisfy the predetermined condition.

In step S1080, the radio base station 1100 notifies the radio communication terminal 1200 that transmission of the private MAP (AAS-Diversity MAP) is to be cancelled, and that a broadcast MAP (DL-MAP and UL-MAP) is to include channel allocation information for the radio communication terminal 1200 instead. Specifically, by using a PCCH in a downlink frame, the radio base station 1100 notifies the radio communication terminal 1200 that the broadcast MAP is to include channel allocation information for the radio communication terminal 1200. The PCCH used here is, for example a PCCH in the downlink frame F11 (see FIG. 12), namely, the sub-channel $CH_s$ of the diversity MAP region M12.

In step S1090, the radio base station 1100 broadcasts a broadcast MAP including channel allocation information for the radio communication terminal 1200 by using the broadcast MAP region M21 in the downlink frame F21.

Note that the radio base station 1100 cancels transmission of the private MAP (AAS-Diversity MAP) for the radio communication terminal 1200 since the radio base station 1100 broadcasts the broadcast MAP including channel allocation information for the radio communication terminal 1200, instead. Thus, as shown in FIG. 12, the downlink frame F21 includes no diversity MAP region like the diversity MAP region M12.

(2) Operation Example 2

Figure 13:
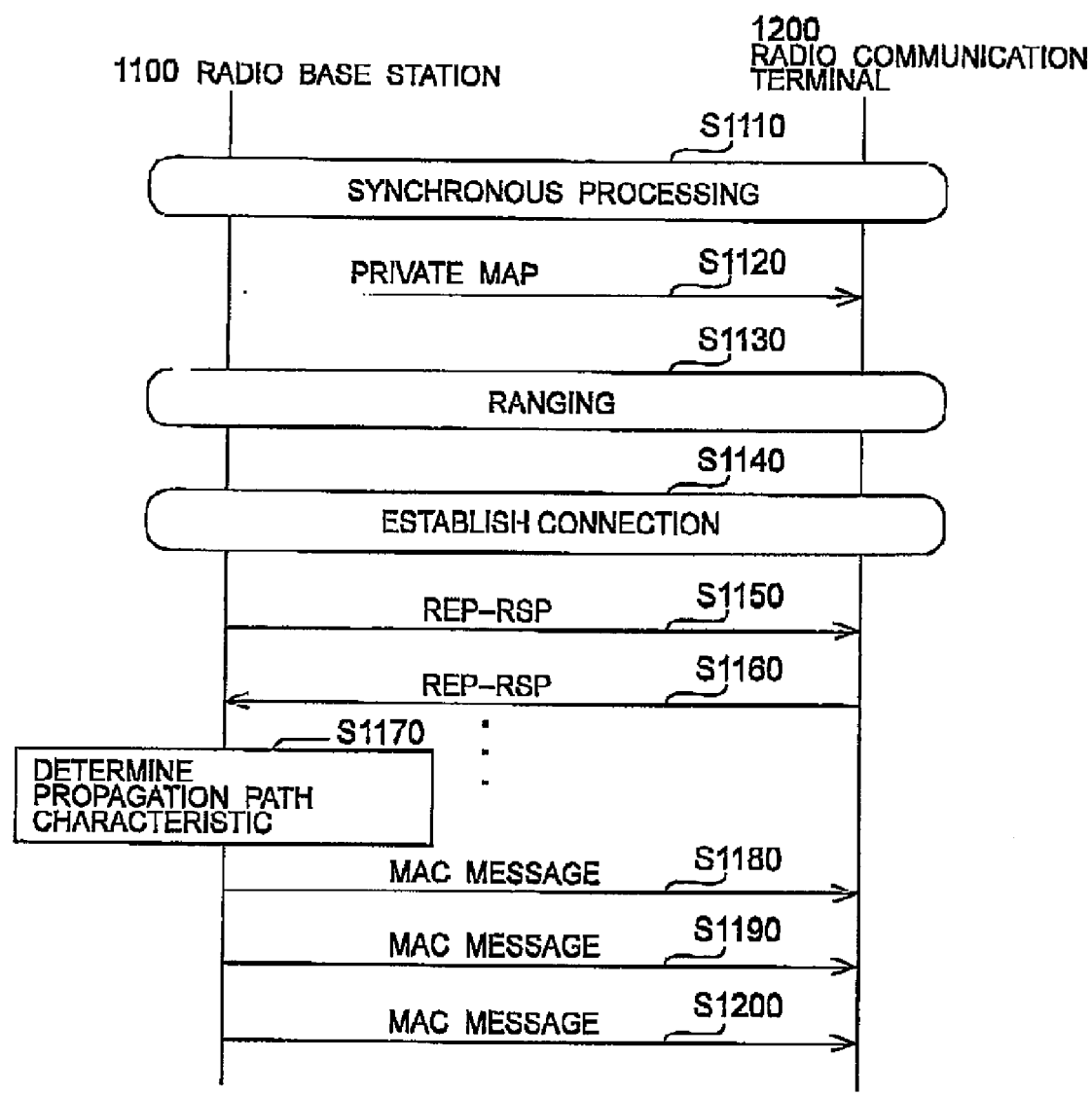
FIG. 13 shows another operational flow in which the radio base station according to the embodiments of the present invention cancels transmission of a private MAP, and puts channel allocation information for the radio communication terminal in a broadcast MAP.

FIG. 13 shows another operational flow in which the radio base station 1100 cancels transmission of a private MAP, and puts channel allocation information for the radio communication terminal 1200 in a broadcast MAP when the radio communication terminal 1200 moves from the inside of the cell C2 into the cell C1.

In the operational flow shown in FIG. 13, both a private MAP for the radio communication terminal 1200 and a broadcast MAP are transmitted in a single downlink frame. In other words, the radio communication terminal 1200 needs only to receive either the private MAP or the broadcast MAP, which can improve MAP (channel allocation information) acquisition probability of the radio communication terminal 1200.

Figure 14:
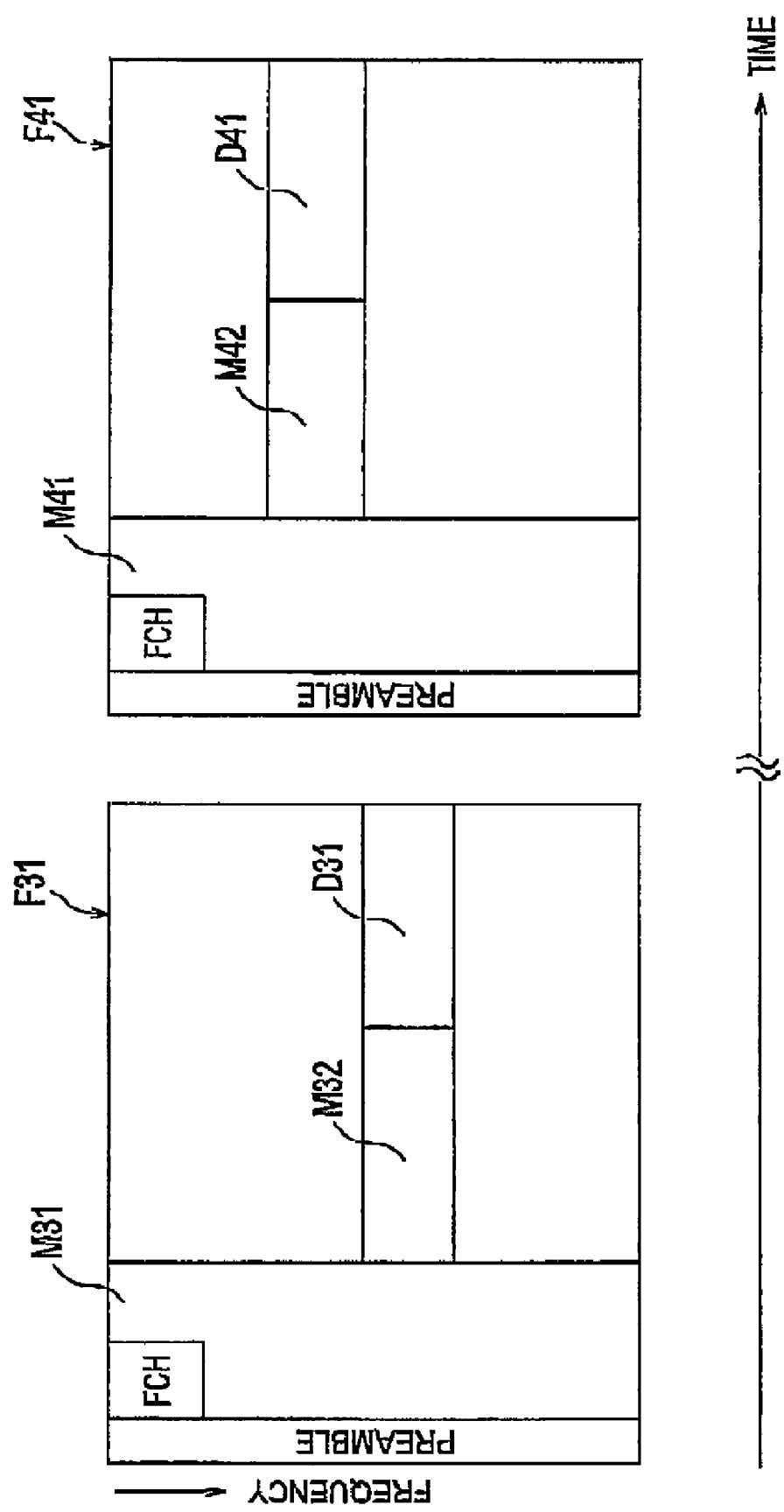
FIG. 14 shows another structure example of downlink frames used in the embodiments of the present invention.

In this operation example, used are downlink frames having different structures from those of the downlink frames F11 and F21 shown in FIG. 12. Specifically, downlink frames F31 and F41 shown in FIG. 14 are used. Hereinafter, differences from the downlink frames F11 and F21 will be mainly described.

An shown in FIG. 14, the downlink frame F31 includes a broadcast MAP region M31. In addition, the downlink frame F31 further includes a diversity MAP region M32 and a data burst region D31.

The broadcast MAP region M31 includes an RAS pointer that indicates the location of a private MAP for the radio communication terminal 1200 included in the diversity MAP region M32.

In addition to the private MAP for the radio communication terminal 1200, the diversity MAP region M32 further includes an AAS pointer that indicates the location of a private MAP for the radio communication terminal 1200 included in a diversity MAP region M42 of the downlink frame F41.

The downlink frame F41 includes a broadcast MAP region M41, the diversity MAP region M42 and a data burst region D41.

The operation in steps S1110 to S1170 shown in FIG. 13 is the same as that in steps S1010 to S1070 shown in FIG. 11. In step S1160, the radio base station 1100 notifies the radio communication terminal 1200 that transmission of the private MAP (AAS-Diversity MAP) is to be cancelled, and that a broadcast MAP (DL-MAP and UL-MAP) is to include channel allocation information for the radio communication terminal 1200, instead. Specifically, by using the sub-channel CH$_s$ of the diversity MAP region M32, the radio base station 1100 notifies the radio communication terminal 1200 that the broadcast MAP is to include channel allocation information for the radio communication terminal 1200.

Then, in step S1190, the radio base station 1100 also broadcasts, in this diversity MAP region, a broadcast MAP including channel allocation information for the radio communication terminal 1200 by using the broadcast MAP region M41 of the downlink frame F41 to be transmitted next.

In step S1200, the radio base station 1100 transmits an AAS-Diversity MAP far the radio communication terminal 1200 to the radio communication terminal 1200 by using the diversity MAP region M42 of the downlink frame F41.

Note that, after the operation in step S1200, the radio communication terminal 1200 may transmit receipt notification indicating reception of the broadcast MAP, to the radio base station 1100. The radio base station 1100 can cancel transmission of the private MAP when acquiring the receipt notification from the radio communication terminal 1200.

EFFECTS AND ADVANTAGES

In the mobile communication system 1000, based on the propagation path characteristics between the radio communication terminal 1200 and the radio base station 1100, the radio base station 1100 determines whether or not to transmit a private MAP (channel allocation information) by using a PCCH. Thus, in the mobile communication system 1000, transmission of channel allocation information (AAS-Diversity MAP) using a PCCH can be cancelled when the radio communication terminal 1200 moves from the inside or the cell C2 (PCCH's reaching cell) into the cell C1 (BCCH's reaching cell). This reduces frequency of transmitting channel allocation information by using both a broadcast control channel and a dedicated control channel.

Accordingly, regions (the diversity MAP region M12) that have been used for transmitting channel allocation information man be allocated to user data, and thus usage efficiency of downlink frames can be improved.

Moreover, in the mobile communication system 1000, channel allocation information for the radio communication terminal 1200 needs only to be transmitted by using either a private MAP or a broadcast MAP. Thus, throughput in a radio section can be improved, and a computing amount regarding channel allocation in the mobile communication system 1000 can be reduced.

In this embodiment, channel allocation information is transmitted by using both a BCCH and a PCCH if the propagation path characteristics between the radio communication terminal 1200 and the radio base station 1100 satisfy the predetermined condition. In other words, a private MAP for the radio communication terminal 1200 and a broadcast MAP can be transmitted in a single downlink frame. This can further improve MAP (channel allocation information) acquisition probability of the radio communication terminal 1200. In particular, even if the radio communication terminal 1200 is located near the fringe of the cell reached by a BCCH, and thus the propagation path characteristics between the radio communication terminal 1200 and the radio base station 1100 are deteriorated enough to disable the radio communication terminal 1200 from receiving the BCCH, the radio communication terminal 1200 can more reliably acquire channel allocation information by using a PCCH.

Moreover, in this embodiment, the radio base station 1100 is capable of cancelling transmission of a private MAP when acquiring receipt notification indicating reception of a broadcast MAP from the radio communication terminal 1200. Accordingly, channel allocation information is less likely to be redundantly transmitted to the radio communication terminal 1200, and thus more regions in downlink frames can be allocated to user data and the like. In other words, usage efficiency of downlink frames is improved.

Other Embodiments

Hereinabove, the subject matters of the present invention have boon disclosed using an embodiment of the present invention. However, it should not be understood that any of the descriptions and the drawings which form part of this disclosure limits the present invention. Various alternative embodiments will be apparent to those skilled in the art from the disclosure.

For example, though both a private MAP for the radio communication terminal 1200 and a broadcast MAP are transmitted in a single downlink frame in the foregoing embodiment, the radio communication terminal 1200 may alternatively be configured to perform diversity reception between a BCCH used for transmitting a broadcast MAP and a PCCH used for transmitting a private MAP.

Specifically, each radio communication terminal 1200 includes a received power measuring unit 1209 (see FIG. 10) to perform diversity reception between a BCCH and a PCCH.

The received power measuring unit 1209 is configured to measure a received power value per unit information volume of each of a BCCH and a PCCH that the radio communication unit 1201 receives. The received power measuring unit 1209 is configured to notify the channel controller 1205 of one of these control channels that has the higher received power value per unit information volume thus measured.

The channel controller 1205 selects channel allocation information (broadcast MAP or private MAP) that is to be transmitted by using the control channel (BCCH or PCCH) thus notified of.

As described above, the prevent invention includes various other embodiments and the like not described herein as a matter of course. Hence, the technical scope of the present invention is only defined by the features of the present invention according to the scope of claims based on the above descriptions.

Note that all the subject matters of Japanese Patent Application No. 2007-44420 (filed on Feb. 23, 2007) and 2007-67220 (filed on Mar. 15, 2007) are incorporated herein by reference.

INDUSTRIAL APPLICABILITY

As described above, the radio base station and the channel allocation information transmission method according to the present invention allow a radio communication terminal to more reliably receive channel allocation information even if the radio communication terminal is located near the fringe of a cell reached as by a broadcast control channel, and thus are useful in radio communications such as mobile communications.

The invention claimed is:

1. A radio base station that transmits channel allocation information indicating allocation of a radio communication channel, to a radio communication terminal by using a downlink frame including a broadcast control channel broadcasted by using an omnidirectional beam and a dedicated control channel transmitted in a predetermined direction by using a directional beam, the radio base station comprising:
   a propagation path characteristic acquisition unit configured to acquire a propagation path characteristic between the radio communication terminal and the radio base station;
   a notification unit configured to notify the radio communication terminal that the channel allocation information is to be transmitted by using the dedicated control channel, if the propagation path characteristic acquired by the propagation path characteristic acquisition unit satisfies a predetermined condition; and
   a channel allocation information transmitter configured to transmit the channel allocation information by using the dedicated control channel in the downlink frame, after the notification unit notifies the radio communication terminal that the channel allocation information is to be transmitted by using the dedicated control channel,
   wherein the channel allocation information transmitter transmits the channel allocation information by using the broadcast control channel and the dedicated control channel if the propagation path characteristic acquired by the propagation path characteristic acquisition unit satisfies the predetermined condition.

2. The radio base station according to claim 1, further comprising
   a receipt notification acquisition unit configured to acquire receipt notification from the radio communication terminal, the receipt notification indicating that the radio communication terminal has received the channel allocation information by using the dedicated control channel, wherein
   the channel allocation information transmitter cancels transmission of the channel allocation information toy using the broadcast control channel if the receipt notification acquisition unit acquires the receipt notification.

3. A channel allocation information transmission method for transmitting channel allocation information Indicating allocation of a radio communication channel, to a radio communication terminal by using a downlink frame including a broadcast control channel broadcasted by using an omnidirectional beam and a dedicated control channel transmitted in a predetermined direction by using a directional beam, the channel allocation information transmission method comprising the steps of:
   acquiring a propagation path characteristic between the radio communication terminal and a radio base station;
   notifying the radio communication terminal that the channel allocation information is to be transmitted by using the dedicated, control channel, if the acquired propagation path characteristic satisfies a predetermined condition; and
   transmitting the channel allocation information by using the dedicated, control channel in the downlink frame, after the radio communication terminal is notified that the channel allocation information is to be transmitted by using the dedicated control channel,
   wherein, in the step of transmitting the channel allocation information, the channel allocation information is transmitted by using the broadcast control channel and the dedicated control channel if the acquired propagation path characteristic satisfies the predetermined condition.

4. The channel allocation information transmission method according to claim 3, further comprising the step of
   acquiring receipt notification from the radio communication terminal, the receipt notification indicating that the radio communication terminal has received the channel allocation information by using the dedicated control channel, wherein
   In the step of transmitting the channel allocation information, transmission of the channel allocation information by using the broadcast control channel is cancelled if the receipt notification is acquired.

5. A radio base station that transmits channel allocation information indicating allocation of a radio communication channel, to a radio communication terminal by using a downlink frame including a broadcast control channel broadcasted by using an omnidirectional beam and a dedicated control channel transmitted in a predetermined direction by using a directional beam, the radio base station comprising:
   a propagation path characteristic acquisition unit configured to acquire a propagation path characteristic between the radio communication terminal and the radio base station;
   a notification unit configured to notify the radio communication terminal that the channel allocation information is to be transmitted by using the broadcast control channel, if the propagation path characteristic acquired by the propagation path characteristic acquisition unit satisfies a predetermined condition; and
   a channel allocation information transmitter configured to transmit the channel allocation information by using the broadcast control channel in the downlink frame, after the notification unit notifies the radio communication terminal that the channel allocation information is to be transmitted by using the broadcast control, channel,
   wherein the channel allocation information transmitter transmits the channel allocation information by using the broadcast control channel and the dedicated control channel if the propagation path characteristic acquired by the propagation path characteristic acquisition unit satisfies the predetermined condition.

6. The radio base station according to claim 5, further comprising
   a receipt notification acquisition unit configured to acquire receipt notification from the radio communication terminal, the receipt notification indicating that the radio communication terminal has received the channel allocation information toy using the broadcast control channel, wherein
the channel allocation information transmitter cancels transmission of the channel allocation information by using the dedicated control channel allocation if the receipt notification acquisition unit acquires the receipt notification.

* * * * *